United States Patent
Kanda et al.

(10) Patent No.: US 9,342,339 B2
(45) Date of Patent: May 17, 2016

(54) METHOD AND SYSTEM FOR CONGESTION MANAGEMENT IN A FIBRE CHANNEL NETWORK

(75) Inventors: Amit Kanda, San Jose, CA (US); Sathish Kumar Gnanasekaran, Santa Clara, CA (US); Vineet Mathew Abraham, Sunnyvale, CA (US); Qingyuan Ma, Saratoga, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 771 days.

(21) Appl. No.: 12/119,448

(22) Filed: May 12, 2008

(65) Prior Publication Data

US 2009/0116381 A1 May 7, 2009

Related U.S. Application Data

(60) Provisional application No. 61/002,252, filed on Nov. 7, 2007.

(51) Int. Cl.
*G01R 31/08* (2006.01)
*G06F 11/00* (2006.01)
*G06F 9/455* (2006.01)
*H04L 12/801* (2013.01)
*H04L 12/825* (2013.01)
*H04L 5/00* (2006.01)
*H04Q 11/00* (2006.01)
*H04L 29/08* (2006.01)

(52) U.S. Cl.
CPC .......... *G06F 9/45558* (2013.01); *H04L 5/0037* (2013.01); *H04L 47/10* (2013.01); *H04L 47/11* (2013.01); *H04L 47/12* (2013.01); *H04L 47/263* (2013.01); *H04L 67/327* (2013.01); *H04Q 11/0005* (2013.01); *G06F 2009/45595* (2013.01); *Y02B 60/31* (2013.01)

(58) Field of Classification Search
CPC .................................................. G06F 9/45558
USPC ......................................................... 370/229
See application file for complete search history.

(56) References Cited

U.S. PATENT DOCUMENTS

| | | | |
|---|---|---|---|
| 5,838,994 A | 11/1998 | Valizadeh | |
| 5,983,278 A * | 11/1999 | Chong et al. | 709/235 |
| 6,504,818 B1 * | 1/2003 | Levine | 370/229 |
| 6,970,425 B1 * | 11/2005 | Bakshi | 370/235 |
| 7,227,840 B1 * | 6/2007 | Ferguson et al. | 370/230 |
| 7,463,627 B1 * | 12/2008 | Chase et al. | 370/389 |
| 7,668,177 B1 | 2/2010 | Trapp | |
| 2004/0218531 A1 * | 11/2004 | Cherian et al. | 370/235 |

(Continued)

*Primary Examiner* — Maharishi Khirodhar
(74) *Attorney, Agent, or Firm* — Shun Yao; Park, Vaughan, Fleming & Dowler LLP

(57) ABSTRACT

One embodiment of the present invention provides a system that facilitates congestion management in a Fibre Channel (FC) network. During operation, the system determines a threshold data rate on an outgoing link coupled to an FC switch. The system further determines the number of sources that send data to the outgoing link and an aggregate arrival rate of data for the outgoing link. Next, the system determines an injection data rate for a respective source based on the threshold data rate on the outgoing link, the number of sources transmitting data to the outgoing link, and the aggregate arrival data rate for the outgoing link. Subsequently, the system communicates the injection data rate to the source, thereby allowing the source to throttle its data injection in the FC network to prevent network congestion.

37 Claims, 13 Drawing Sheets

| Time | O(t) | S@A1 | S@A2 | S@A3 | S@B | I@A1 | I@A2 | I@A3 | I@B | A@C | Remarks |
|---|---|---|---|---|---|---|---|---|---|---|---|
| -1 | | 100 | 100 | 100 | 100 | - | - | - | - | 100 | Before the algorithm starts |
| 0 | | 25 | 25 | 25 | 25 | | | | | | |
| 0+ | | 25 | 25 | 25 | 25 | 25 | 25 | 20 | 10 | 80 | Note that A3 and B can only inject at 20 and 10 respectively. This line shows the ingress data rate at the sources after the rate limit from the previous time (t=0) has been applied. |
| 1 | 0.8 | 31.25 | 31.25 | 31.25 | 31.25 | | | | | | |
| 1+ | | 31.25 | 31.25 | 31.25 | 31.25 | 31.25 | 31.25 | 20 | 10 | 92.5 | |
| 2 | 0.925 | 33.78 | 33.78 | 33.78 | 33.78 | | | | | | |
| 2+ | | 33.78 | 33.78 | 33.78 | 33.78 | 33.78 | 33.78 | 20 | 10 | 97.56 | |
| 3 | 0.9756 | 34.62 | 34.62 | 34.62 | 34.62 | | | | | | |
| 3+ | | 34.62 | 34.62 | 34.62 | 34.62 | 34.62 | 34.62 | 20 | 10 | 99.24 | |
| 4 | 0.9924 | 34.89 | 34.89 | 34.89 | 34.89 | | | | | | |
| 4+ | | 34.89 | 34.89 | 34.89 | 34.89 | 34.89 | 34.89 | 20 | 10 | 99.78 | |
| 5 | 0.9978 | 34.97 | 34.97 | 34.97 | 34.97 | | | | | | |
| 5+ | | 34.97 | 34.97 | 34.97 | 34.97 | 34.97 | 34.97 | 20 | 10 | 99.94 | |
| 6 | 0.9994 | 34.99 | 34.99 | 34.99 | 34.99 | | | | | | |
| 6+ | | 34.99 | 34.99 | 34.99 | 34.99 | 34.99 | 34.99 | 20 | 10 | 99.98 | |
| 7 | 0.9998 | 35 | 35 | 35 | 35 | 35 | | | | | |
| 7+ | | 35 | 35 | 35 | 35 | 35 | 35 | 20 | 10 | ~100 | At this point the rate of data transmitted from sources (A1,A2,A3,B) to C is equal to the capacity of the link at C. |

(56) References Cited

U.S. PATENT DOCUMENTS

| | | |
|---|---|---|
| 2006/0013135 A1 | 1/2006 | Schmidt |
| 2006/0092932 A1 | 5/2006 | Ghosh |
| 2006/0098572 A1* | 5/2006 | Zhang et al. .................. 370/229 |
| 2006/0233102 A1 | 10/2006 | Kusumoto |
| 2006/0251067 A1 | 11/2006 | DeSanti |
| 2007/0174851 A1 | 7/2007 | Smart |
| 2008/0209007 A1* | 8/2008 | Gurecki et al. ............... 709/218 |
| 2009/0080334 A1* | 3/2009 | DeCusatis et al. ............ 370/237 |

* cited by examiner

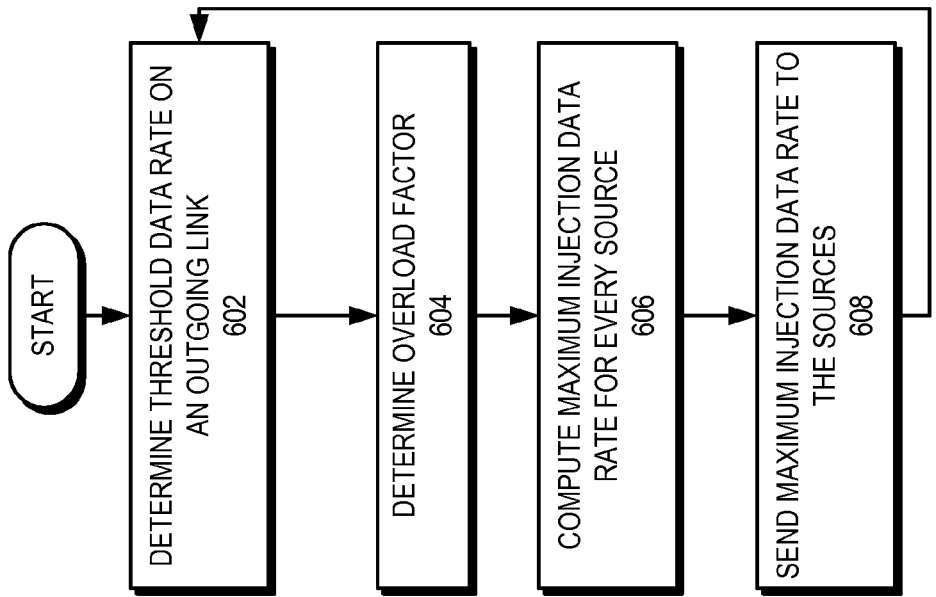
FIG. 6B
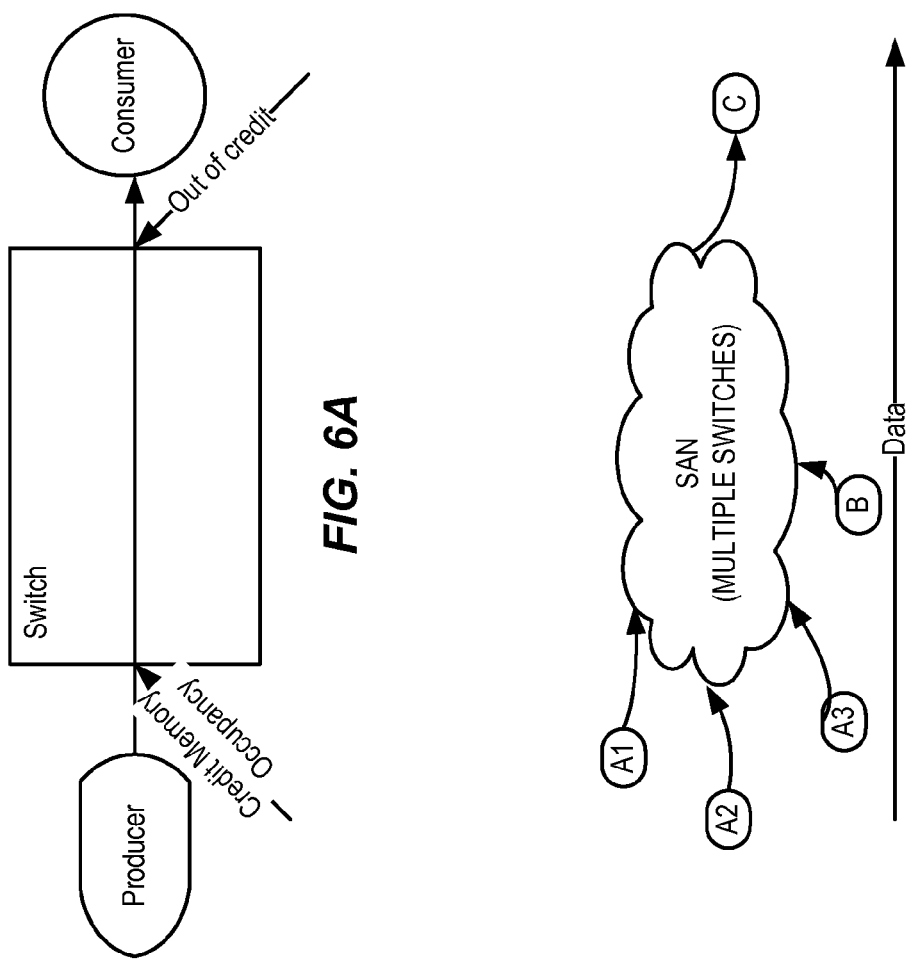
FIG. 6A
FIG. 7A

| Time | O(t) | S@A1 | S@A2 | S@A3 | S@B | I@A1 | I@A2 | I@A3 | I@B | A@C | Remarks |
|---|---|---|---|---|---|---|---|---|---|---|---|
| -1 | | 100 | 100 | 100 | 100 | - | - | - | - | 100 | Before the algorithm starts |
| 0 | | 25 | 25 | 25 | 25 | | | | | | |
| 0+ | | 25 | 25 | 25 | 25 | 25 | 25 | 20 | 10 | 80 | Note that A3 and B can only inject at 20 and 10 respectively. This line shows the ingress data rate at the sources after the rate limit from the previous time (t=0) has been applied. |
| 1 | 0.8 | 31.25 | 31.25 | 31.25 | 31.25 | 31.25 | 31.25 | 20 | 10 | 92.5 | |
| 1+ | | 31.25 | 31.25 | 31.25 | 31.25 | | | | | | |
| 2 | 0.925 | 33.78 | 33.78 | 33.78 | 33.78 | 33.78 | 33.78 | 20 | 10 | 97.56 | |
| 2+ | | 33.78 | 33.78 | 33.78 | 33.78 | | | | | | |
| 3 | 0.9756 | 34.62 | 34.62 | 34.62 | 34.62 | 34.62 | 34.62 | 20 | 10 | 99.24 | |
| 3+ | | 34.62 | 34.62 | 34.62 | 34.62 | | | | | | |
| 4 | 0.9924 | 34.89 | 34.89 | 34.89 | 34.89 | 34.89 | 34.89 | 20 | 10 | 99.78 | |
| 4+ | | 34.89 | 34.89 | 34.89 | 34.89 | | | | | | |
| 5 | 0.9978 | 34.97 | 34.97 | 34.97 | 34.97 | 34.97 | 34.97 | 20 | 10 | 99.94 | |
| 5+ | | 34.97 | 34.97 | 34.97 | 34.97 | | | | | | |
| 6 | 0.9994 | 34.99 | 34.99 | 34.99 | 34.99 | 34.99 | 34.99 | 20 | 10 | 99.98 | |
| 6+ | | 34.99 | 34.99 | 34.99 | 34.99 | | | | | | |
| 7 | 0.9998 | 35 | 35 | 35 | 35 | 35 | 35 | 20 | 10 | ~100 | At this point the rate of data transmitted from sources (A1,A2,A3,B) to C is equal to the capacity of the link at C. |
| 7+ | | 35 | 35 | 35 | 35 | | | | | | |

*FIG. 7B*

| Time | O(t)@E1 | O(t)@E2 | O(t)@D | S@S1 Based on D | S@S2 Based on D | S@S3 Based on D | S@S1 Based on E2 | S@S2 Based on E2 | S@S1 Based on E1 | I@S1 | I@S2 | I@S3 | A@E1 | A@E2 | A@D | Remarks |
|---|---|---|---|---|---|---|---|---|---|---|---|---|---|---|---|---|
| -1 | | | | | | | | | 100 | - | - | - | 50 | 25 | 100 | Before the algorithm starts |
| 0 | | | | 33.33 | 33.33 | 33.33 | 100 | 100 | 25 | | | | | | | Note that different points E1, E2 and D are requiring different source rates from S1, S2 and S3. The source transmits at a rate that is lowest of all, e.g., S1 transmits at 12.5. |
| 0+ | | | | | | | | | | 12.5 | 12.5 | 33.3 | 12.5 | 25 | 58.33 | |
| 1 | 0.125 | 1.0 | 0.5833 | 57.14 | 57.14 | 57.14 | 12.5 | 12.5 | 200 | | | | | | | |
| 1+ | | | | | | | | | | 12.5 | 12.5 | 57.14 | 12.5 | 25 | 82.14 | |
| 2 | 0.125 | 1.0 | 0.8214 | 69.56 | 69.56 | 69.56 | 12.5 | 12.5 | 200 | | | | | | | |
| 2+ | | | | | | | | | | 12.5 | 12.5 | 69.56 | 12.5 | 25 | 94.56 | |
| 3 | 0.125 | 1.0 | 0.9456 | 73.56 | 73.56 | 73.56 | 12.5 | 12.5 | 200 | | | | | | | |
| 3+ | | | | | | | | | | 12.5 | 12.5 | 73.56 | 12.5 | 25 | 98.56 | |
| 4 | 0.125 | 1.0 | 0.9856 | 74.63 | 74.63 | 74.63 | 12.5 | 12.5 | 200 | | | | | | | |
| 4+ | | | | | | | | | | 12.5 | 12.5 | 74.63 | 12.5 | 25 | 99.63 | |
| 5 | 0.125 | 1.0 | 0.9963 | 74.91 | 74.91 | 74.91 | 12.5 | 12.5 | 200 | | | | | | | |
| 5+ | | | | | | | | | | 12.5 | 12.5 | 74.91 | 12.5 | 25 | 99.91 | |
| 6 | 0.125 | 1.0 | 0.9991 | 74.98 | 74.98 | 74.98 | 12.5 | 12.5 | 200 | | | | | | | |
| 6+ | | | | | | | | | | 12.5 | 12.5 | 74.98 | 12.5 | 25 | 99.98 | |
| 7 | 0.125 | 1.0 | 0.9998 | 74.99 | 74.99 | 74.99 | 12.5 | 12.5 | 200 | | | | | | | |
| 7+ | | | | | | | | | | 12.5 | 12.5 | 74.99 | 12.5 | 25 | 99.99 | |
| 8 | 0.125 | 1.0 | 0.9999 | 75.00 | 75.00 | 75.00 | 12.5 | 12.5 | 200 | | | | | | | |
| 8+ | | | | | | | | | | 12.5 | 12.5 | 75.00 | 12.5 | 25 | 100 | |

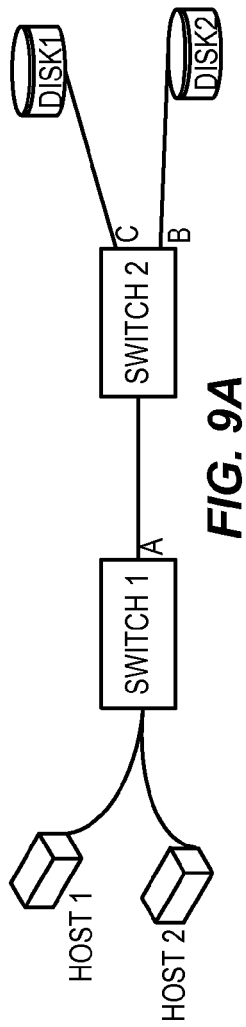

FIG. 9A

| Time | O(t)@A | O(t)@B | O(t)@C | S@H1 Based on A | S@H2 Based on A | S@H1 Based on C | S@H2 Based on B | I@H1 | I@H2 | A@A | A@B | A@C | Remarks |
|---|---|---|---|---|---|---|---|---|---|---|---|---|---|
| -1 | | | | 100 | 100 | 100 | 100 | 1 | 1 | 2 | 1 | 1 | Before the algorithm starts. Now because disk1 is slow and host 1 is capable of injecting data at full rate to disk1, there will be congestion detected at C. So by the stated rule the capacity of the link between switch 2 and disk 2 will be assumed to be 1 unit only. |
| 0 | | | | | 50 | | 100 | 1 | 50 | 51 | 50 | 1 | While computing the overload factor remember that capacity of link C is 1. |
| 0+ | | | | 50 | 50 | 1 | | | | | | | |
| 1 | 0.51 | 0.50 | 1.0 | 98 | 98 | 1 | 100 | 1 | 98 | 99 | 98 | 1 | |
| 1+ | | | | 98 | 98.99 | 1 | | | | | | | |
| 2 | 0.99 | 0.98 | 1.0 | 98.99 | 98.99 | 1 | 100 (102) | 1 | 98.99 | 99.99 | 98.99 | 1 | |
| 2+ | | | | | 98.99 | | | | | | | | |

FIG. 9B

| Time | O(t)@K | O(t)@Y1 | O(t)@Y2 | O(t)@Y3 | S@X1 Based on K | S@X1 Based on Y1 | S@X1 Based on Y2 | S@X1 Based on Y3 | I@X1 | A@K | A@Y1 | A@Y2 | A@Y3 |
|------|--------|---------|---------|---------|------------------|-------------------|-------------------|-------------------|------|-----|------|------|------|
| -1 | | | | | 100 | 100 | 100 | 100 | 3 | 3 | 0.33 | 0.33 | 0.33 |
| 0 | | | | | 100 | 50 | 2 | 1 | 1 | 1 | | | |
| 0+ | | | | | 100 | 100 | | 1 | | | 0.33 | 0.33 | 0.33 |
| 1 | 0.01 | 0.07 | 0.17 | 0.33 | 100 | 100 | 11.76 | 3.03 | 3.03 | 3.03 | | | |
| 1+ | | | | | 100 | 100 | | 3 | | | 1.02 | 1.01 | 1 |
| 2 | 0.0303 | 0.0204 | 0.505 | 1.01 | | | 23.29 | 3 | 3 | 3 | | | |
| 2+ | | | | | | | 3 | 3 | 3 | 3 | 1 | 1 | 1 |

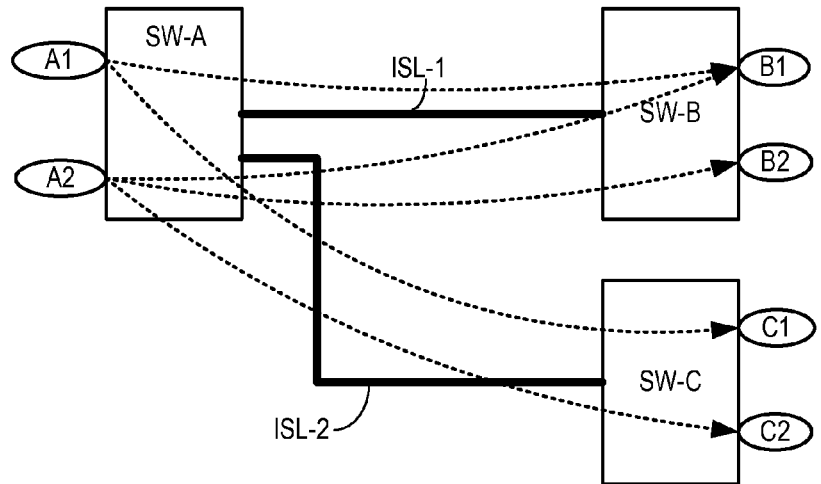
FIG. 11
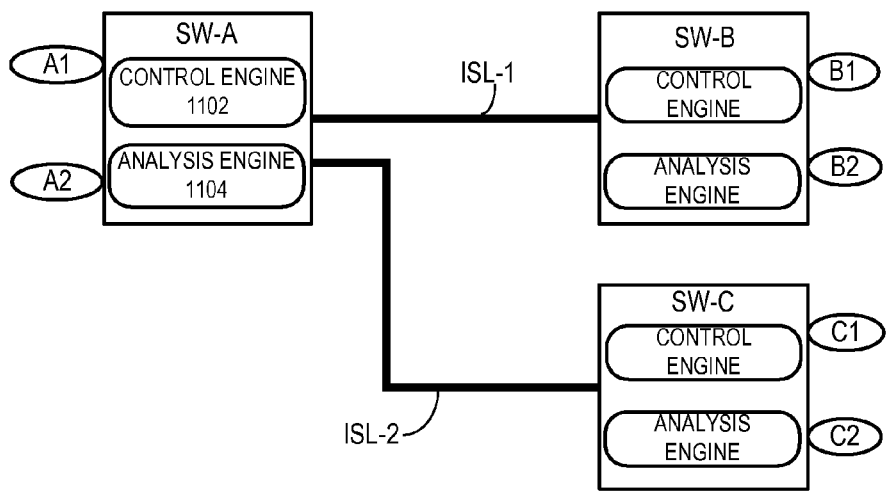
FIG. 12
| Local Port | Remote Switch Identifier (Domain# for FC Switches) | Explicit Requirement.** |
|---|---|---|
| A1 | SW-B | 50 |
|  | SW-C | 40 |
| A2 | SW-B | 55 |
|  | SW-C | 31 |
|  |  |  |
FIG. 13

METHOD AND SYSTEM FOR CONGESTION MANAGEMENT IN A FIBRE CHANNEL NETWORK

RELATED APPLICATION

This application claims the priority and benefit under 35 U.S.C. section 119 to U.S. Provisional Patent Application Ser. No. 61/002,252, entitled "Adaptive Networking Advanced Data Center Fabric Technology," filed 7 Nov. 2007.

The subject matter of this application is related to the subject matter in the following co-pending non-provisional applications:

- U.S. patent application Ser. No. 12/119,440, entitled "AUTOMATIC ADJUSTMENT OF LOGICAL CHANNELS IN A FIBRE CHANNEL NETWORK," by inventors Amit Kanda and Kung-Ling Ko, filed 12 May 2008;
- U.S. patent application Ser. No. 12/119,436, entitled "METHOD AND SYSTEM FOR FACILITATING APPLICATION-ORIENTED QUALITY OF SERVICE IN A FIBRE CHANNEL NETWORK," by inventor Amit Kanda, filed 12 May 2008;
- U.S. patent application Ser. No. 12/119,457, entitled "WORKLOAD MANAGEMENT WITH NETWORK DYNAMICS," by inventor Amit Kanda, filed 12 May 2008;
- U.S. patent application Ser. No. 12/119,430, entitled "METHOD AND SYSTEM FOR FACILITATING QUALITY OF SERVICE IN EDGE DEVICES IN A FIBRE CHANNEL NETWORK," by inventor Amit Kanda, filed 12 May 2008; and
- U.S. patent application Ser. No. 11/782,894, entitled "Method and Apparatus for Determining Bandwidth-Consuming Frame Flows in a Network," by inventor Amit Kanda, filed 25 Jul. 2007;

the disclosures of which are incorporated by reference in their entirety herein.

BACKGROUND

1. Field

The present disclosure relates to Fibre Channel networks. More specifically, the present disclosure relates to a method and apparatus for managing network congestion in a Fibre Channel network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions such as building large server farms.

A predominant form of SAN is the Fibre Channel (FC) network. FC standards were developed based on High Performance Parallel Interface (HIPPI), a data channel standard developed by Los Alamos National Laboratory in the 1980's. HIPPI was designed as a supercomputer I/O interface with high throughput and minimal switching function. As time went on, optical fiber became cheaper and more reliable, and FC was developed as a successor to HIPPI to take advantage of the high capacity of fiber optics. FC can carry data channels including HIPPI, Small Computer Systems Interface (SCSI), and multiplexor channels used on mainframes, as well as network traffic, including IEEE 802, Internet Protocol (IP), and Asynchronous Transfer Mode (ATM) packets. Like HIPPI, the basic topology of an FC network is a star topology with a switch fabric at the center to connect inputs to outputs.

Historically, conventional network appliances (e.g., data-center servers, disk arrays, backup tape drives) mainly use an FC network to transfer large blocks of data. Therefore, FC switches provide only basic patch-panel-like functions. In the past decade, however, drastic advances occurred in almost all the network layers, ranging from the physical transmission media, computer hardware and architecture, to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual machines, have unleashed the power of fast hardware and provide an unprecedented versatile computing environment.

As a result of these technological advances, an FC switch fabric faces a much more heterogeneous, versatile, and dynamic environment. The port count on a switch fabric is becoming progressively larger, and its topology increasingly more complex. Conventionally, FC switches and host bus adaptors do not have any congestion-management mechanisms. However, as the edge devices' injection data rate continues to grow and more data flows traverse multiple switches in the fabric, network congestion is more likely to occur in an FC network. Congestion can impair network performance, and severe congestion can even cause the network to collapse.

SUMMARY

One embodiment of the present invention provides a system that facilitates congestion management in a Fibre Channel (FC) network. During operation, the system determines a threshold data rate on an outgoing link coupled to an FC switch. The system further determines the number of sources that send data to the outgoing link and an aggregate arrival rate of data for the outgoing link. Next, the system determines an injection data rate for a respective source based on the threshold data rate on the outgoing link, the number of sources transmitting data to the outgoing link, and the aggregate arrival data rate for the outgoing link. Subsequently, the system communicates the injection data rate to the source, thereby allowing the source to throttle its data injection in the FC network to prevent network congestion.

In a variation of on this embodiment, the system performs the above operations at regular time intervals.

In a variation on this embodiment, determining the threshold data rate on the outgoing link involves setting the threshold data rate to the lesser of the capacity of the outgoing link and the highest data rate at which the receiving end of the outgoing link can accept data.

In a variation on this embodiment, determining the injection data rate for the source comprises dividing the threshold data rate on the outgoing link by the number of sources sending data to the outgoing link.

In a further variation, determining the injection data rate for the source further involves computing an overload factor by dividing the aggregate arrival rate of data for the outgoing link by the threshold data rate on the outgoing link; and dividing a previous injection data rate for the source computed in a previous iteration.

In a variation on this embodiment, determining the injection data rate for the source involves computing a tentative injection rate for the source in conjunction with each outgoing link on the switch and setting the injection data rate for the source to be the lowest tentative injection rate.

In a variation on this embodiment, determining the threshold data rate on the outgoing link involves determining the threshold data rate of a logical channel on the outgoing link. Furthermore, the bandwidth on the outgoing link is allocated into a plurality of logical channels, and a respective logical channel is associated with a dedicated buffer and can transport a plurality of data flows with data frames of variable length.

In a further variation, determining the threshold data rate of the logical channel involves dynamically allocating unused bandwidth from other logical channels to the logical channel based on the QoS class of the logical channel.

One embodiment of the present invention provides a system for managing congestion in an FC network. During operation, the system determines a threshold data rate on an outgoing link coupled to an FC switch. The system further determines an aggregate arrival rate of data for the outgoing link and determines that the aggregate arrival rate of data for the outgoing link exceeds the threshold data rate. The system then sends a congestion notification to a switch or source which sends data to the outgoing link, thereby allowing the switch or source to apply a throttle to its injection data rate to prevent network congestion. When the aggregate arrival rate of data for the outgoing link does not exceed the threshold data rate, the system does not comprise sending a second notification to the switch or source to remove the throttle In a variation on this embodiment, determining that the aggregate arrival rate of data for the outgoing link exceeds the threshold data rate involves monitoring a buffer corresponding to the outgoing link.

In a variation on this embodiment, the system receives a congestion notification indicating that a reduction of injection date rate is desired. Upon receiving the notification, the system reduces the injection data rate by a multiplicative factor.

In a variation on this embodiment, upon receiving the congestion notification, the system automatically increases the injection data rate until the injection data rate reaches a predetermined value of when another congestion notification is received.

BRIEF DESCRIPTION OF THE FIGURES

FIG. 6A illustrates an example of a switch monitoring the credit buffer memory occupancy to detect congestion, in accordance with an embodiment of the present invention.

FIG. 6B presents a flowchart illustrating the process of performing ESRC-based congestion management in a switch, in accordance with an embodiment of the present invention.

FIG. 7A illustrates an example of how ESRC operates, in accordance with an embodiment of the present invention.

FIG. 7B illustrates the target source rate computed using ESRC for the example illustrated in FIG. 7A, in accordance with an embodiment of the present invention.

FIG. 9A illustrates an example of how ESRC operates, in accordance with an embodiment of the present invention.

FIG. 9B illustrates the target source rate computed using ESRC for the example illustrated in FIG. 7A, in accordance with an embodiment of the present invention.

FIG. 11 illustrates an example of distributed congestion management using ESRC, in accordance with an embodiment of the present invention.

FIG. 12 illustrates the control engine and analysis engine present in a switch for performing ESRC, in accordance with an embodiment of the present invention.

FIG. 13 illustrates exemplary target source rated computed for the example illustrated in FIG. 12, in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

Overview

Embodiments of the present invention facilitate dynamic congestion management in an FC network. Particularly, a switch or host bus adaptor (HBA) can automatically throttle data flows based on the degree of congestion on a link, so that the sources do not overload the network and impair the traffic on other links. In some embodiments, both the switches and edge devices participate in the congestion management, which provides an effective, distributed flow-control mechanism.

Figure 1:
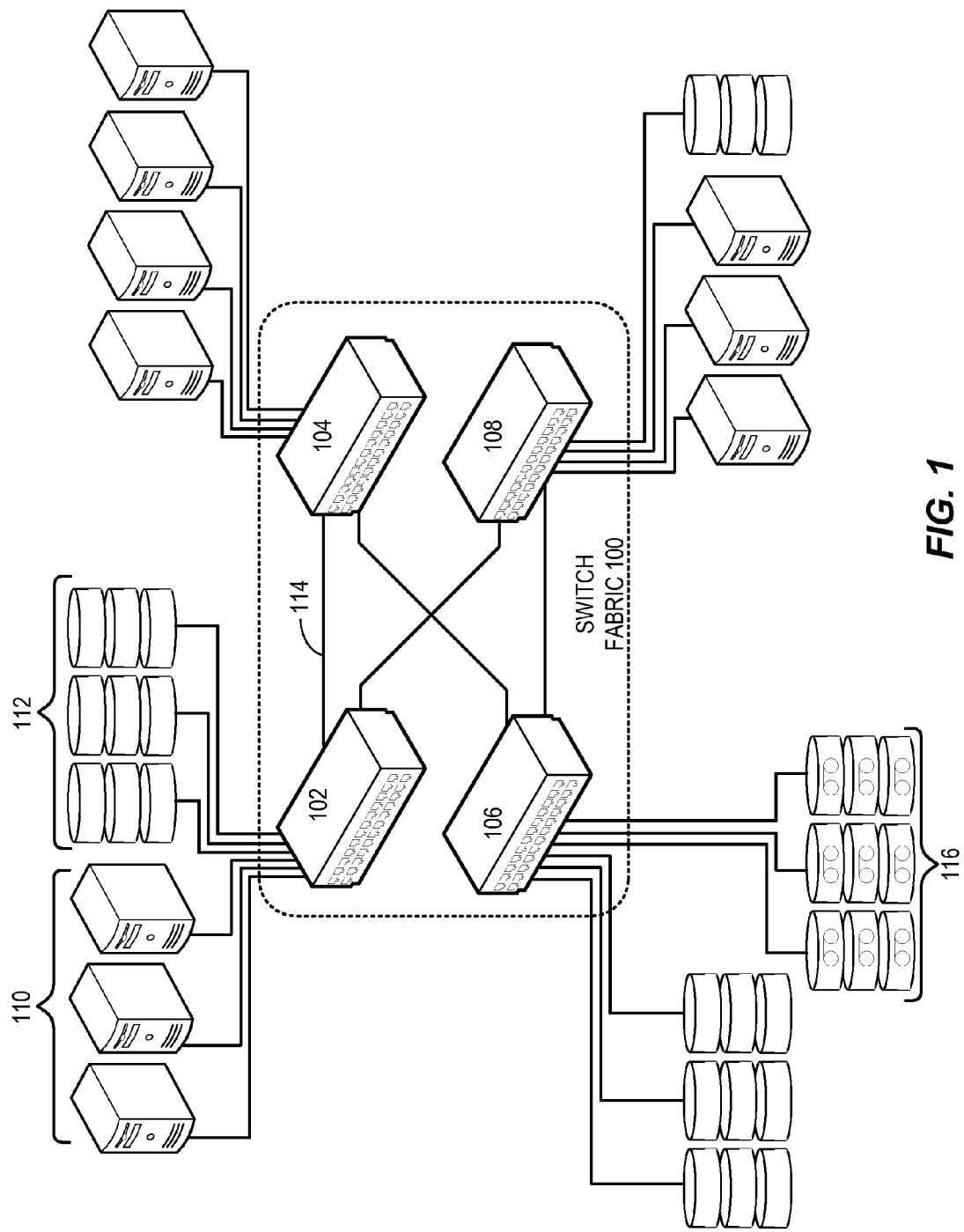
FIG. 1 illustrates an exemplary FC network that facilitates congestion management, in accordance with an embodiment of the present invention.

FIG. 1 illustrates an exemplary FC network that provides application-oriented QoS capabilities in edge devices, in accordance with an embodiment of the present invention. In this example, an FC switch fabric 100 includes four switch modules, 102, 104, 106, and 108. Each switch module is coupled to a group of network appliances. For example, switch module 102 is coupled to a number of servers 110 and a number of disk arrays 112. A respective network appliance can communicate with any appliance (referred to as "target") in the FC network.

For example, one of the servers 110 can transfer data to and from one of tape backup devices 116. Note that, since the switch modules are not connected in a fully meshed topology, the data frames transferred between servers 110 and tape devices 116 traverse three switch modules 102, 104, and 106. In general, the switch modules are coupled by inter-switch links (ISLs), such as ISL 114.

As shown in the example in FIG. 1, large-port-count FC switch fabrics often include a number of smaller, interconnected individual switches. The internal connectivity of a switch fabric can be based on a variety of topologies. In this disclosure, the term "switch fabric" refers to a number of interconnected FC switch modules. The terms "switch module" and "switch" refer to an individual switch which can be connected to other switch modules to form a larger port-count switch fabric. The term "edge device" refers to any network appliance, either physical or logical, coupled to a switch.

A switch typically has two types of ports: fabric port (denoted as F_Port), which can couple to a network appliance, and extension port (E_Port), which can couple to another switch. A network appliance communicates with a switch through a host bus adaptor (HBA). The HBA provides the interface between an appliance's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

Generally, network congestion occurs when a link, which can be an ISL or a switch-to-appliance, is overloaded with data or exhibit a slow data rate due to the receiving end consuming data too slowly. Embodiments of the present invention provide mechanisms which can detect such congested links and notify the source of data flows contributing to the congestion to slow down. For example, in FIG. 1, switch 108 can run a monitoring mechanism that monitors the F_Ports on switch 108. When the outgoing link coupled to a respective F_Port becomes congested, switch 108 the corresponding data sources to slow down their data injection. This way, the network can remain operational and congestion-related performance degradation can be controlled.

The heterogeneous nature of modern FC networks imposes new challenges. In conventional FC networks, the appliances are mostly for data storage or backup purposes and usually have similar QoS requirements and data-processing speeds. However, today's FC networks are often used for a variety of purposes, and the appliances in an FC network can have drastically different QoS requirements and data-processing speeds. It is possible to provision differentiated QoS classes on an FC physical link by dividing the bandwidth into logical channels (also referred to as "virtual channels"). Different virtual channels can be grouped into different QoS classes, and can isolate the data frames transported therein. Furthermore, different QoS classes can be associated with a large range of entities at different hierarchies, e.g., physical machine, virtual machine, application, and sub-application message groups. Note that in this disclosure the term "QoS" or "quality of service" refers to an arbitrary set of service quality parameters. A QoS level or class can be based on an arbitrary number of metrics. For example, a given QoS level can specify a guaranteed or best-effort data rate. A more sophisticated QoS level can further specify other parameters, such as maximum delay and delay variation, maximum data frame loss rate, and maximum frame misdelivery rate.

Although virtual channels can isolate traffic within different channels, congestion can still occur on a per-virtual-channel bases, since a virtual channel can carry multiple data flows. Embodiments of the present invention provide a mechanism that can manage the congestion on a physical link as well as on a virtual channel.

Virtual Channel and QoS

Conventionally, to prevent a target device from being overwhelmed with data frames, an FC network provides several basic, link-based flow-control mechanisms based on a buffer credit system. A credit represents a device's ability to accept one frame. A sender maintains a transmission buffer, and transmits one frame from the buffer when a credit is received from the receiving device. In previous generations of FC switches, each outgoing link on a switch or HBA is associated with one buffer. This buffer is responsible for storing data frames from data flows. In this disclosure, the term "data flow" is loosely defined as the data frames flowing from a source entity to a destination entity. In one embodiment, the source can be identified by a source ID (S_ID), and a destination can be identified by a destination ID (D_ID). In conventional FC networks, the source ID refers to the outgoing port on the source HBA, and the destination ID refers to the incoming port on the destination HBA. In this disclosure, however, a source or destination ID can be associated with a wide range of logical entities, including a physical appliance (e.g., a physical server) to which an HBA belongs, a virtual appliance, an application, or a sub-application message group.

One problem associated with the conventional buffer configuration is that it is very difficult to provide different QoS to different data flows when these data flows are transported on a common link. For example, a low-priority data flow may travel on a common link with a high-priority data flow. The data frames from these two flows are mingled in the common buffer, which makes provisioning of differentiated QoS difficult.

One way to solve this problem is to divide the bandwidth in an inter-switch or switch-to-HBA link into logical channels and serve each logical channel with a separate buffer. This way, data flows of different priorities can be assigned to different logical channels and, since each logical channel has a separate buffer, the data flows can be sufficiently isolated from each other. Furthermore, a switch can provision different QoS levels to the logical channels by using various buffer scheduling schemes. For example, the switch can allocate different guaranteed or best-effort data rates to different logical channels or groups of logical channels by using a weighted round-robin scheme when retrieving and transmitting data frames stored in the different buffers.

In one embodiment, such logical channels are referred to as "virtual channels" or "VCs." More implementation details of virtual channels are disclosed in U.S. Pat. No. 7,239,641, entitled "Quality of Service Using Virtual Channel Translation" by Banks, et al., and "Virtual Channels for Switched Fabric" by Martin, et al., available at www.t10.org/ftp/t11/document.04/04-093v0.pdf, the disclosure of which is incorporated by reference herein in its entirety.

Note that the virtual channel in FC networks should be distinguished from the "virtual circuit" (which is sometimes also called "virtual channel") in ATM networks. An ATM virtual circuit is an end-to-end data path with a deterministic routing from the source to the destination. That is, in an ATM network, once the virtual circuit for an ATM cell is determined, the entire route throughout the ATM network is also determined. More detailed discussion on ATM virtual circuits can be found in "Computer Networks," Section 5.6, by A. S. Tanenbaum, 3rd Ed., Prentice-Hall, 1996.

In contrast, an FC virtual channel is a local logical channel on a physical link, between two switches or between a switch and an HBA. That is, an FC virtual channel only spans over a single link. When an FC data frame traverses a switch, the virtual channel information can be carried by appending a temporary tag to the frame. The allows the frame to be associated to the same VC identifier on outgoing link of the link. However, the VC identifier does not determine a frame's routing, because frames with different destinations can have the same VC identifier and be routed to different outgoing ports, even if they arrive on the same incoming port of a switch. An ATM virtual circuit, on the other hand, spans from the source to the destination over multiple links. Furthermore, an FC virtual channel carries FC data frames, which are of variable length. An ATM virtual circuit, however, carries ATM cells, which are of fixed length.

Figure 2:
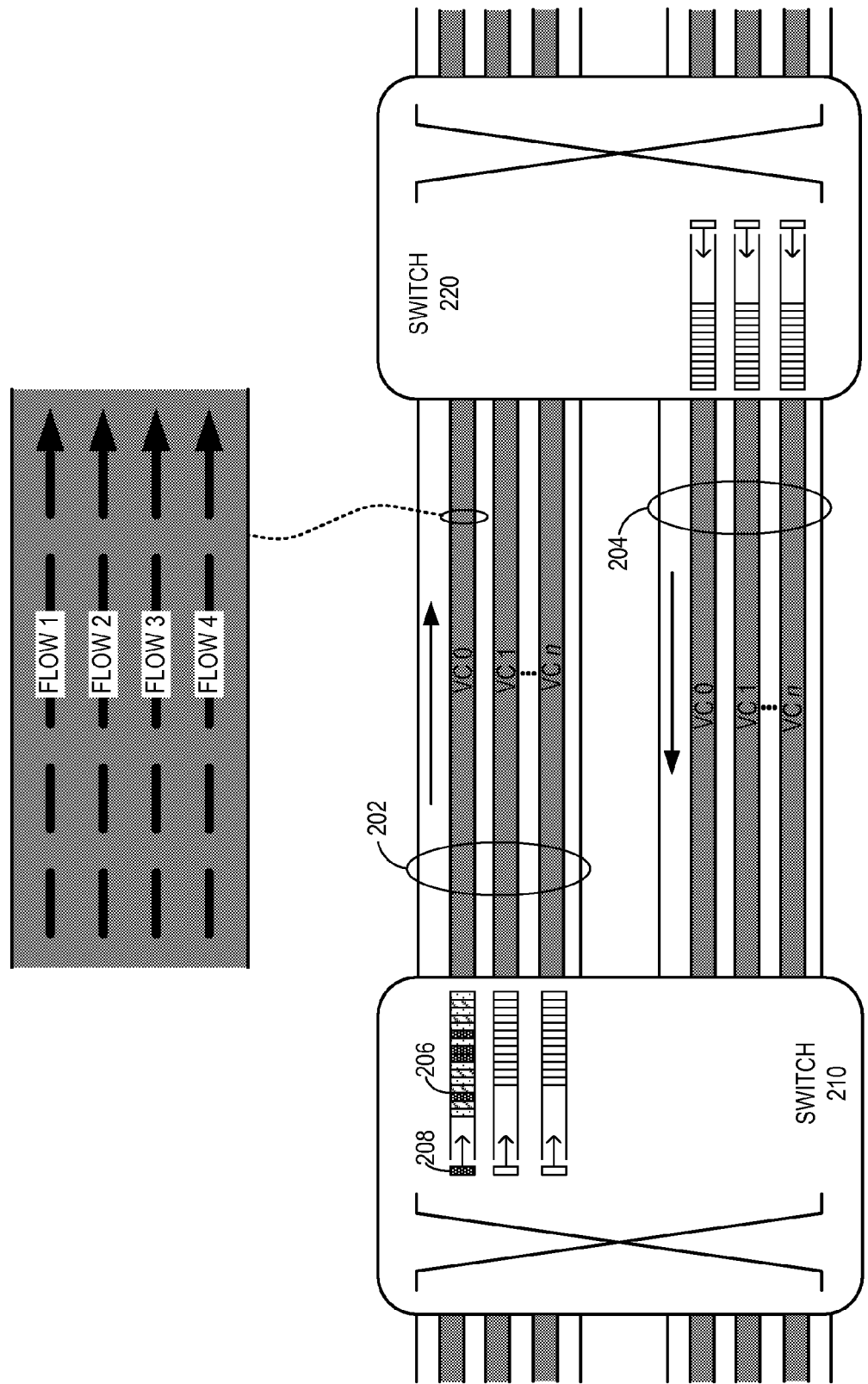
FIG. 2 illustrates exemplary virtual channels and data flows, in accordance with an embodiment of the present invention.

FIG. 2 illustrates exemplary virtual channels and data flows, in accordance with an embodiment of the present invention. In this example, a switch 210 is coupled to a switch 220 by an outgoing physical link 202 and an incoming physical link 204. Each physical link is divided into a number of virtual channels. For example, link 202 is divided into virtual channels VC 0, VC 1, . . . , VC n. A respective virtual channel is associated with a buffer dedicated to that virtual channel. Furthermore, a buffer may store data frames from a number of data flows. Correspondingly, a virtual channel can carry multiple data flows.

For example, VC 0 on link 202 is associated with a transmission buffer 206 in switch 210. Buffer 206 stores data frames from multiple data flows, such as data frame 208. Note that in FIG. 2 different frames of different data flows in buffer 206 are presented with different fill patterns. FIG. 2 also illustrates a zoomed-in view of the contents of VC 0 on link 202. Here VC 0 of link 202 carries four data flows, FLOW 1, 2, 3, and 4. Note that these flows may correspond to the same source and destination or to a different source and destination. In other words, although these flows share the same virtual channel on link 202, they might belong to different end-to-end routes. This is an important distinction between FC virtual channels and ATM virtual circuits, because all the data cells in an ATM virtual circuit belong to the same source/destination pair.

In one embodiment, the VCs on a link can be assigned to different QoS levels, and the switch can schedule transmission from their respective buffers accordingly. For example, among all the VCs on a link, some VCs may have guaranteed bandwidth, wherein the switch periodically serves the buffer associated with these VCs to guarantee a minimum data rate. Other VCs may be assigned different weights and may participate in a weighted round-robin scheme in transmitting frames in their respective buffers. Note that a variety of buffer-scheduling schemes can be used to achieve different QoS results.

Figure 3:
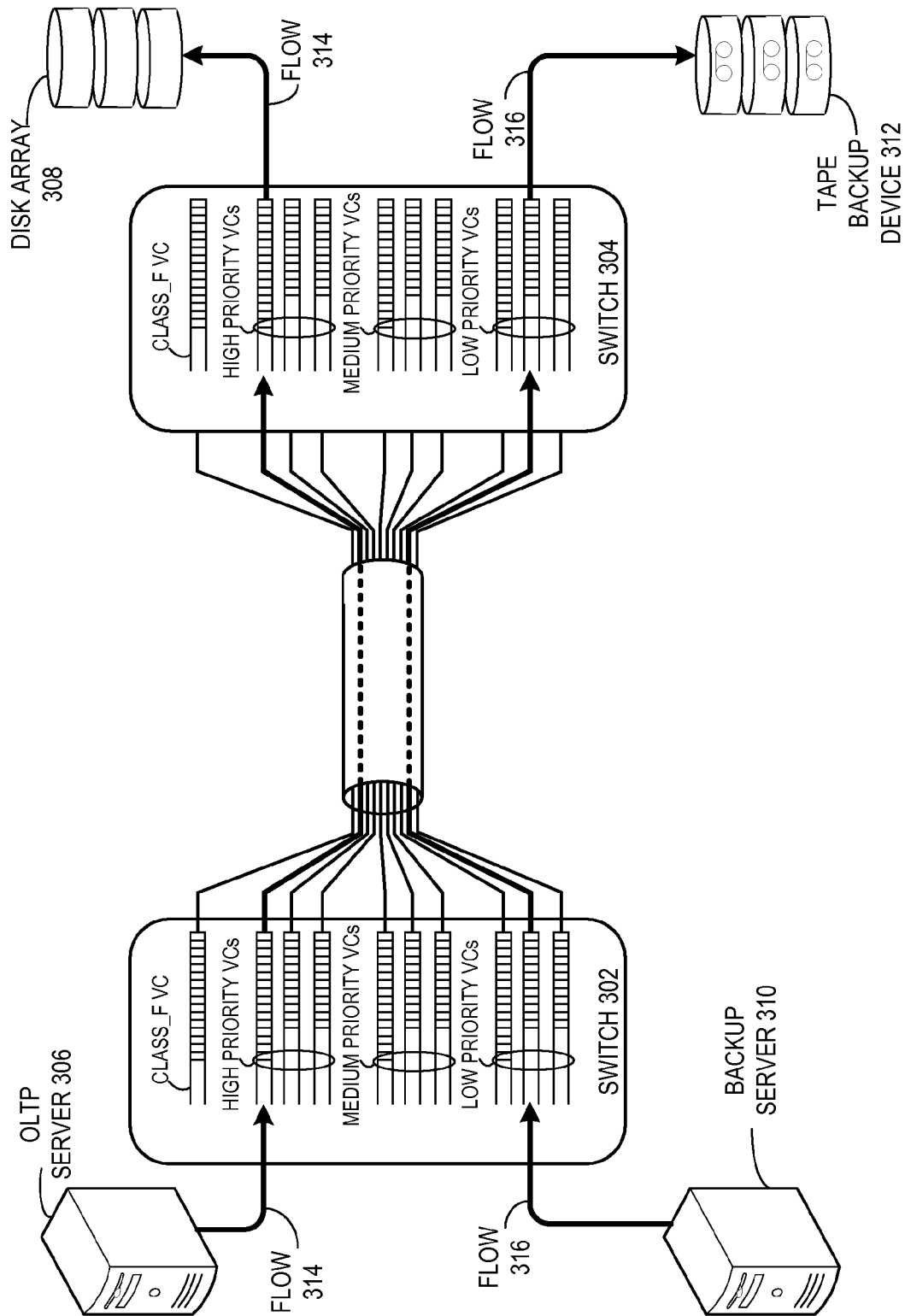
FIG. 3 illustrates an example of providing different QoS to different data flows in an FC switch fabric, in accordance with an embodiment of the present invention.

FIG. 3 illustrates an example of providing different QoS to different data flows in an FC switch fabric, in accordance with an embodiment of the present invention. In this example, the physical link between switches 302 and 304 contains a number of VCs. These VCs are grouped into several QoS classes: Class_F, high priority, medium priority, and low priority. The Class_F VC corresponds to the Class_F traffic as defined in the FC standards and carries critical network control and management traffic. In one embodiment, the Class_F VC (or VCs) is served with a strict-priority scheduling scheme. The other three QoS classes can use a weighted round-robin scheduling scheme. In one embodiment, a respective VC in the high, medium, and low QoS classes is assigned a relative weight.

In the example in FIG. 3, a data flow 314 is originated from an online transaction processing (OLTP) server 306 and destined for a disk array 308. Flow 314 carries mission-critical transaction data, and therefore is assigned to a VC with high priority. Meanwhile, a second data flow 316 is carried on the same physical link. Data flow 316 is between a backup server 310 and a tape backup device 312. Flow 316 is assigned to a VC with a low priority, because data backups typically do not require fast response time as do OLTP transactions. Since each VC has a separate buffer, flows 314 and 316 can be transported on the same physical link independent from each other. In other words, even if tape backup device 312 is slow in processing data frames, data frames from flow 316 do not interfere with the data transfer of flow 314.

Although the VC configuration illustrated in FIG. 3 can isolate data flows between switches, a new challenge arises when one physical machine runs multiple virtual machines or applications and produces multiple data flows. For example, when OLTP server 306 runs multiple copies of virtual servers or different applications, the data generated by each virtual server or application may be of different importance. However, if all the data are co-mingled and share the bandwidth of the link between the HBA of server 306 and switch 302, the low-priority data can block and slow down high-priority data. Such a problem exists because conventional HBAs are nothing more than a network interface card. When the host machine is virtualized and different applications have different QoS requirements, the limited functions of a network interface card can no longer suffice.

One solution to this challenge is to extend VC and QoS capabilities to the logical entities with different granularities associated with an HBA. Such logical entities include, but are not limited to: physical appliances, virtual appliances, applications, and sub-application message groups. A physical appliance can be any physical device that can communicate with an FC switch, such as a server, a disk array, or a tape backup device. A virtual appliance can be any logical device, such as a virtual machine or a virtual drive. An application can be any program running on a physical or virtual appliance. A sub-application message group can be any set of data that are communicated within an application. For example, the critical financial transaction data communicated within an e-commerce application can be one message group, while the data exchange for regular browsing can be a different message group.

With the HBA extension, VC-based QoS can be provided to the end points residing with the HBAs. Furthermore, these end points are not limited to physical entities, but can include any type of logical entities at different levels. Such extension significantly improves the flexibility of the FC network. With these new capabilities, an FC network can quickly adapt to a dynamic and heterogeneous network environment.

Figure 4:
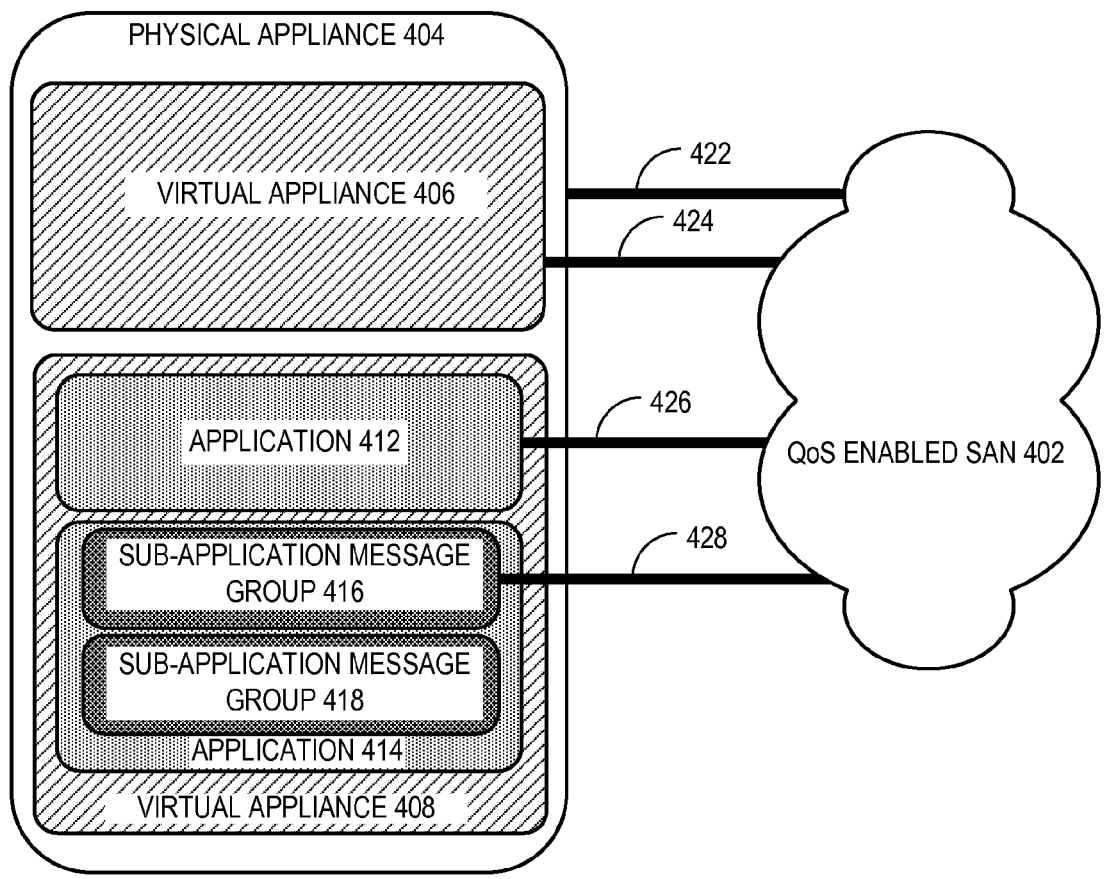
FIG. 4 illustrates QoS provisioning to different logical entities within a physical appliance, in accordance with an embodiment of the present invention.

FIG. 4 illustrates QoS to different logical entities within a physical appliance, in accordance with an embodiment of the present invention. The example in FIG. 4 shows how different logical entities, or device objects, can be classified and associated with VCs. In one embodiment, a network end device has an outer object which is a physical appliance, such as physical appliance 404, and which can be referred to by an FC network address (world-wide name or N_Port). Physical appliance 404 may host one or more virtual appliances, such as virtual appliances 406 and 408, each of which can also be referred to by an FC network address, such as an N_Port ID Virtualization (NPIV) address. Similarly, a virtual appliance may host multiple applications, such as applications 412 and 414, and a respective application may include many sub-application message groups, such as sub-application message groups 416 and 418.

In one embodiment, each level of the logical entities is referred to as an object class. For example, there can be a physical-appliance class, a virtual-appliance class, an application class, and a sub-application class. Other definition of object classes is also possible. Each object in an object class, e.g., a physical appliance, a virtual appliance, or an application, can be associated with an individual VC and a QoS class. For example, physical appliance 404 can send data to a QoS-enabled SAN 402 using VC 422. Meanwhile, virtual appliance 406, application 412, and sub-application message group 416 can each transfer data to SAN 402 via VCs 424, 426, and 428 respectively. Note that to implement differentiated QoS provisioning to the logical entities, the HBA associated with physical appliance 404 is capable of assigning data flows to virtual channels and virtual channels to QoS classes. Details of how to implement a VC and QoS-enabled HBA are provided in U.S. patent application Ser. No. TBA, entitled "Method and System for Facilitating Application-Oriented Quality of Service in a Fibre Channel Network," by inventor Amit Kanda, filed 12 May 2008, and U.S. patent application Ser. No. TBA, entitled "Method and System for Facilitating Quality of Service in Edge Devices in a Fibre Channel Network," by inventor Amit Kanda, filed 12 May 2008, the disclosures of which are incorporated herein in their entirety.

Congestion in FC Networks

Congestion in an FC network can occur in multiple ways. The following description presents the typical congestion scenarios.

Figure 5A:
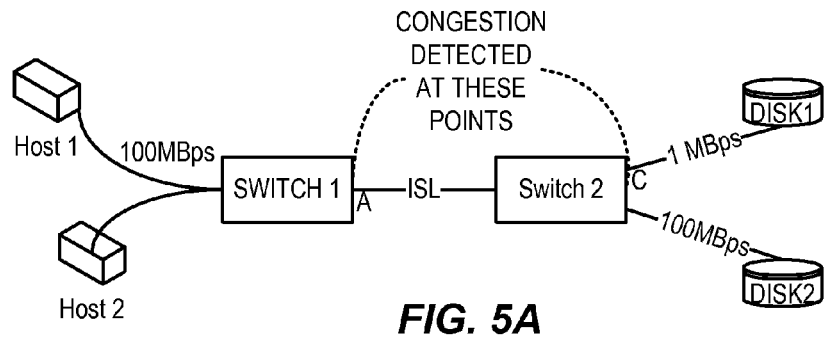
FIG. 5A illustrates an exemplary scenario where congestion is caused by a slow edge device.

Slow Device: In this scenario, slow device can cause network congestion, essentially affecting other flows on the same network path which are capable of achieving better throughput. As illustrated in FIG. 5A, two devices, disk 1 and disk 2 are coupled to switch 2. Two hosts, host 1 and host 2, are coupled to switch 1. Switch 1 and switch 2 are coupled by an ISL. Assume that host 1 is communicating with disk 1 and host 2 with disk 2. Both data flows share a single ISL which couples switch 1 and switch 2. Furthermore, assume that all links are of the same transmission speed. Host 1, host 2, and disk 2 are capable of transferring data at 100 MBps, whereas disk 1 is only capable of receiving data at 1 MBps.

If these two data flows shares a common buffer-to-buffer credits for the ISL in switch 1, the slow data transfer rate of disk 1 will cause frames to back up along the path from the hosts to the disks. As a result, the throughput on ISL will be significantly lower than its designed capacity. In other words, data flow host 2→disk 2 is impacted by flow the slow flow host 1→disk 1. From the switch's perspective, switch 2 will detect a buffer saturation at its egress F_Port C, and switch 1 will detect a buffer saturation at its egress E_Port A.

There are two possible solutions to the congestion scenario illustrated in FIG. 1: slowing down the source and separating the two data flows in two different VCs. If host 1 is not communicating with any targets other than disk 1, slowing down host 1 by slow credit return may be an ideal solution. If host 1 is communicating with more than one target, the separating the two flows may be ideal. Note that even when the two flows are separated by different VCs, the slow flow may still slow down other flows sharing the same VC.

Figure 5B:
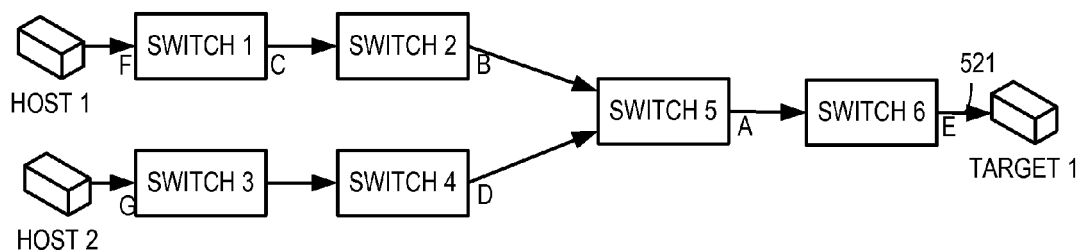
FIG. 5B illustrates an exemplary scenario wherein congestion is caused by oversubscription.

Oversubscription: Over-subscription is the case where the rate of data being injected into a fixed pipe is more that the output data rate of the pipe. As illustrated in FIG. 5B, all the links are capable of transmitting data at 200 MBps. Both host 1 and host 2 are communicating with target 1. Each host is capable of injecting data at 200 MBps to the target, but link 521 only has a total capacity of 200 MBps. In such a case, at F_Port E of switch 6, the buffer-to-buffer credit will frequently drop to zero due to the congested link 521, although link 521 is running at its full capacity, 200 MBps. In this case, the target and link 521 are considered oversubscribed.

Figure 5C:
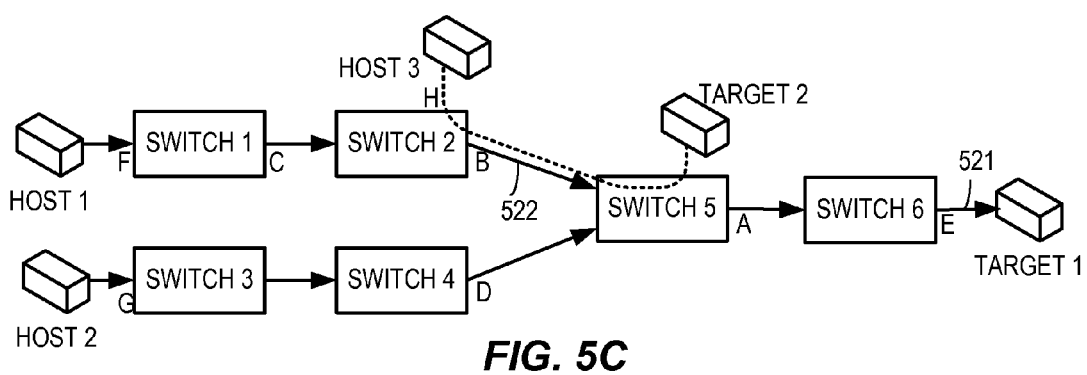
FIG. 5C illustrates another exemplary scenario wherein congestion is caused by oversubscription.

Oversubscription can causes congestion in the network and impact data flows between other devices. Consider the example illustrated in FIG. 5C, which is similar to that illustrated in FIG. 5B, except that host 3 is now communicating with target 2 via ISL 522. Since E_Port B on switch 2 is congested because of the flow from host 1 to target 1, host 3 can only push data at 100 MBps to target 2, although host 3 is capable of transmitting at 200 MBps to target 2. In other words, the F_Port H on switch 2 appears to be congested to host 3.

In practice, it is difficult to determine which flow, i.e., (host 3→target 2) or (host 1→target 1), is the real bottleneck. Note that neither target 1 nor target 2 is slow. The congestion is actually caused by the insufficient link capacity within the network due to oversubscription. In such a case the congestion can be detected on the E_Ports, instead of the F_Ports as in the slow-device case illustrated in FIG. 5A. Note that in case of slow device the congestion can also be detected on a switch's F_Port. There are two possible solutions for this problem. One is to separate the flows (host 3→target 2) or (host 1→target 1) on different VCs. The other is to rate-limit the source.

Figure 5D:
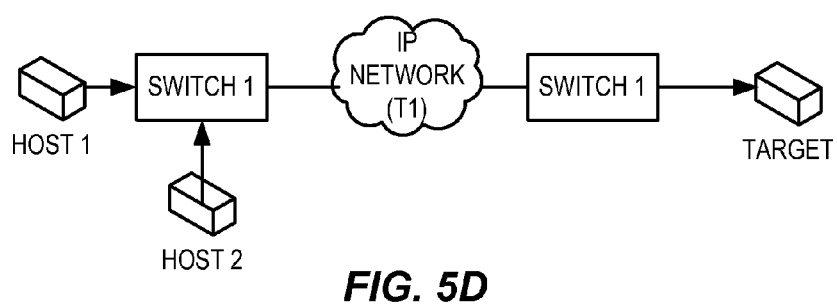
FIG. 5D illustrates an exemplary scenario wherein congestion is caused by high link-bandwidth disparity in the network.

High Link-bandwidth Disparity: As illustrated in FIG. 5D, this scenario is a special case of oversubscription in an FC-over-IP network configuration, where high-speed FC links (e.g., 2, 4, or 8 Gbps) are carried over an IP network with relatively low bandwidth (say, at T1 speed). If the congestion is prolonged it may result in FC link resets, resulting in frame drops.

The congestion detection can be performed in FC ports by monitoring the buffer-to-buffer credits at the egress ports. The amount of time the buffer-to-buffer credit is zero can be used an indication of congestion. The more time an egress port spends without far-end buffer-to-buffer credit, the longer the outgoing frames have to wait at the egress end. In other words, the longer the egress port is out of far-end buffer-to-buffer credits, the more server the congestion is. Other approaches can also be used to infer the congestion. For example, as illustrated in FIG. 6A, the switch can monitor the credit buffer memory occupancy at the ingress of each port. The higher the occupancy, the more server the congestion would be downstream.

Congestion Management

As described above, the network congestion can be caused by slow edge devices as well as insufficient link bandwidth within the network. Embodiments of the present invention provide mechanisms for detecting and controlling both types of congestion. Specifically, on the edge of the network (e.g., at F_Ports on switches or HBAs), an explicit source rate computation (ESRC) method is used. In the core of the network (e.g., at E_Ports on switches), an additive-increase-multiplicative-decrease (AIMD) method can be used.

Explicit Source Rate Computation (ESRC)

In embodiments of the present invention, ESRC is implemented on the egress F_Ports on switches or the HBAs. The goal is to identify congested egress ports (and links), compute a target source data rate for each source contributing to the congested port, and notify the corresponding sources. The sources can be an ingress port on a switch or an HBA.

More specifically, a switch associated with an egress port or an HBA computes the maximum data that a source can inject into the network and explicitly communicates this maximum data rate to the source. The upper limit of ingress data rate is controlled. The computation is performed in a distributed manner at the switches and/or HBAs.

A main feature of this computation is that it limits to the sources to produce just enough data the destination can absorb at the destination's maximum capacity. Since theoretically the data is produce as fast as the data consumed by the destination, the credit buffers of all the links along the data path are not saturated, thus allowing other non-related data flows to transfer data at maximum possible capacity. This results in better network throughput.

The following mathematical formulation describes the ESRC. The computation is performed iteratively at regular time intervals, i.e. , t, t+1, t+2, . . . . At each interval, the maximum data rate for each source is computed again based on the current congestion situation and the maximum data rate computed in the previous iteration. Note that here t is expressed in a logical time unit. In practice, a unit of t can be millisecond, second, minute, or any other time interval.

At the egress port of a switch or the virtual-server interface of an HBA, the suggested maximum data rate for each of the source that contributes to a congested port or a congested virtual port (e.g., NPIV port to a virtual server) in an HBA at a given instance of time t is denoted as S(t). At the initialization, i.e., when t=0, and S(t) is expressed as:

$$S(t) = \frac{C}{N}, \quad (1)$$

where C denotes a threshold data rate on the congested link or NPIV port to a server. Note that threshold data rate C can be the maximum capacity of that link or NPIV port, or the maximum rate of data consumption at a target device.

After the initialization, i.e., when t>=1, S(t) can be expressed as:

$$S(t) = \frac{S(t-1)}{O(t)}, \quad (2)$$

where O(t) is an overload factor which compensates for over-subscription of the congested link. In one embodiment, O(t) is defined as:

$$O(t) = \frac{A(t)}{C}, \quad (3)$$

wherein A(t) denotes the actual aggregate throughput through the congested link (A<=C).

Note that it is possible that a source may be sending data to more than one destination. In this case, each destination may demand different rate limits to be applied to the same source port. In one embodiment, the source port can be limited to the minimum rates among all the rates required by the destinations.

FIG. 6B presents a flowchart illustrating the process of performing ESRC-based congestion management on a switch, in accordance with an embodiment of the present invention. During operation, the system first determines a threshold data rate on an outgoing link (operation 602). The system then determines the overload factor (operation 604). Next, the system computes the maximum injection data rate S(t) for every source (operation 606). Subsequently, the system sends the computed maximum injection data rates to the respective sources (operation 608).

FIGS. 7A-10B illustrates different examples of applying ESRC. FIG. 7A illustrates a basic case that demonstrates the functionality of ESRC. In this example, a SAN includes a number of switches and five devices, A1, A2, A3, B, and C, attached at various points in the network. Devices A1, A2, A3, and B are sending data to a common destination C. Assume that the capacity of each link is 100 units, and that applications running on the sources have the intent or capacity to inject data at the following rates (in logical units):

A1→C@100
A2→C@50
A3→C@20
B→C@10.

Assume that C can consume at a rate of 100. The goal is to limit the data rate from each source so that they send C just enough data and the aggregate of all the data sent to C is equal to the capacity of the link to C, which is 100 units.

FIG. 7B illustrates the results of ESRC for the example in FIG. 7A at each iteration. In this table (and the tables in other figures), "S" denotes the maximum source data rate computed at each iteration. For example, "S@A1" denotes the maximum data rate for A1. "I" denotes the actual data rate injected at an ingress port by a source. For example, "I@A1" indicates the actual ingress data rate at source A1. Furthermore, "A@C" denotes the aggregate throughput at the destination C.

As illustrated in the table in FIG. 7B, before the initialization (t=−1), the maximum injection rate at each source is set at 100, which is the maximum link capacity. At initialization (t=0), S(0) is set for each source. Since the threshold data rate C at the target is 100, each source receives a maximum injection rate of 25.

At time t=0+, which is after the initialization but before the next computation (which is scheduled to occur at t=1), the actual injection data rate from each source is measured. Since A3 and B only intend to transmit at 20 and 10, respectively, the measured injection data rate from these two sources, I@A3 and I@B, are 20 and 10, respectively. Correspondingly, the aggregate throughput at C, A@C, is measured to be 80.

At time t=1, the overload factor O(t) is computed based on A@C. since A@C=80, the overload factor O(t=1)=0.8. This means that the link to destination C has a utilization of 0.8. The maximum injection rates for the sources are then scaled by the overload factor. As a result, the maximum injection rates are increased to 31.25. Correspondingly, at time t=1+, the measured injection rates from A1 and A2 are both 31.25, while I@A3 and I@B remain to be 20 and 10, respectively.

The above computation process then continues, theoretically in an infinite loop. Note that at t=7+, the injection rates of all the sources converge to their respective values such that A@C is approximately 100, and the overload factor is approximately 1. This indicates that the link leading to the destination is almost fully utilized.

Figures 8A, 8B:
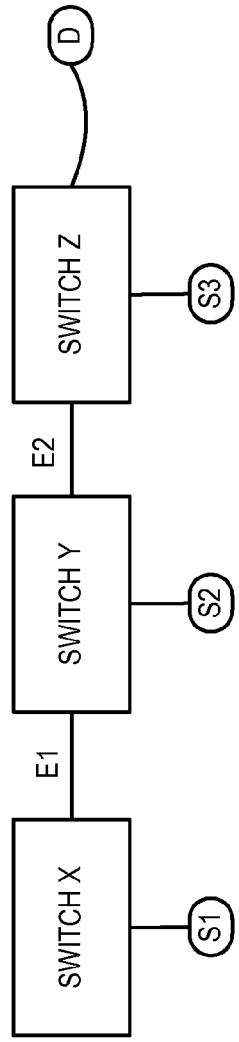
FIG. 8A illustrates an example of how ESRC operates, in accordance with an embodiment of the present invention.
FIG. 8B illustrates the target source rate computed using ESRC for the example illustrated in FIG. 7A, in accordance with an embodiment of the present invention.

FIG. 8A illustrates an example where the data path has vary trunk capacity from the source to the destination. In this example, there are three inter-connected switches, switch X, switch Y, and switch Z. Switch X is coupled to switch Y via an ISL E1 with a capacity of 25. Similarly, switch Y is coupled to switch Z via an ISL E2 with a capacity of 25. The link from switch Z to destination D has a capacity of 100. Devices S1, S2, and S3 are coupled to switch X, switch Y, and switch Z, respectively. These three devices intend to inject data to destination D at the following rates:

S1→D@100
S2→D@100
S3→D@100.

ESRC is performed by all the switches at their respective congestion points. That is, switch X performs ESRC for S1 with respect to ISL E1; switch Y performs ESRC for S1 and S2 with respect to ISL E2, and switch Z performs ESRC for S1, S2, and S3 with respect to destination D. Correspondingly, a source can receive multiple maximum data rates from different switches. For example, source S1 can receive the maximum injection rates from switches X, Y, and Z. In one embodiment, a source adopts the maximum injection rate with the smallest value.

As shown in FIG. 8, before initialization (t=−1), all the source maximum injection rates are 100, the maximum link capacity. At initialization (t=0), source S1 receives three maximum injection rates: 33.33 from switch Z based on destination D, 12.5 from switch Y based on ISL E2, and 25 from switch X based on ISL E1. Source S1 then selects the smallest value, 12.5, to be its maximum injection rate. Similar, sources S2 and S3 select 12.5 and 33.3 to be their injection rate, respectively.

In the next iteration (t=1), each switch computes its overload factor based on the measured link throughput, and updates the corresponding maximum injection rate for each switch accordingly. This process then repeats. At time t=8+, the injection rates from all the sources converge, and the link to designation D is fully utilized.

FIG. 9A illustrates an example where a slow device can cause network congestion, essentially affecting other flows on the same data path which are capable of better throughput. This example demonstrates how ESRC can help the network achieve optimal throughput. In this example, disk 1 and disk 2 are coupled to switch 2. Host 1 and host 2 are coupled to switch 1. Switch 1 and switch 2 are coupled by an ISL. Assume all the links are of the same speed. Host 1, host 2, and disk 2 are capable of transferring data at a data rate of 100, whereas disk 1 can only transfer data at a rate of 1.

Since disk 1 is a slow device, it will cause buffer backup along the path from the hosts to the disks. This backup limits the data throughput across the ISL to about 2 units. In other words, data flow host 2→disk 2 is significantly slowed down by data flow host 1→disk 1. After applying ESRC, the network can achieve the following:

Host 1 to switch 1: data transfer will be restricted to 1 unit.
Host 2 to switch 1: data transfer will be restricted to 99 units.
ISL between switch 1 and switch 2 will show 100 unit throughput.
Switch 2 to disk 1: data transfer rate will be 1 unit (restricted by disk 1 itself).
Switch 2 to disk 2: data transfer rate will be 99 units.

The results of ESRC in the example shown in FIG. 9A are illustrated in FIG. 9B. Note that, in case of credit-based networks (like Fibre Channel networks), a data recipient that is inherently slow can slow down the actual capacity of the link if the link is dedicated to the recipient. In such a case, the capacity of the link shall be assumed to be the maximum data that the recipient can consume. A slow device impacts the network if the sources of data to this recipient are sending more data then the recipient can absorb. So the rule can be defined by stating that if on the recipient side of the switch congestion is detected then the data transfer rate at the recipient shall be considered to the threshold data rate for the link. For example, at point C on switch 2, if the congestion is detected and the data rate from switch 2 to disk 1 is 1 unit, then the capacity of the link from switch 2 to disk 1 is assumed to be 1 unit.

Figures 10A, 10B:
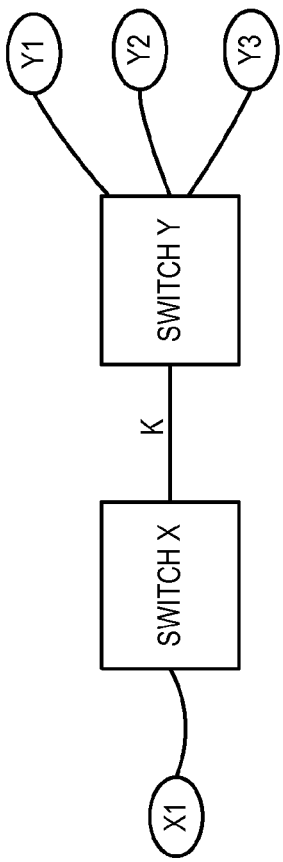
FIG. 10A illustrates an example of how ESRC operates, in accordance with an embodiment of the present invention.
FIG. 10B illustrates the target source rate computed using ESRC for the example illustrated in FIG. 7A, in accordance with an embodiment of the present invention.

In the example illustrated in FIG. 10A, a single source X1 is sending data to multiple data consumers, Y1, Y2, and Y3, which are coupled to switch Y. Switch Y is coupled to switch X by an ISL K. The link between switch Y and Y1 has a capacity of 50, whereas the links to Y2 and Y3 have a capacity of 2 and 1, respectively. X1 is capable of sourcing data at a rate of up to 100 units.

ESRC is performed on all the congestion points with respect to Y1, Y2, Y3, and E. In other words, X1 will receive four different maximum injection rates computed based on these four congestion points. In one embodiment, X1 choose the one with the smallest value as its injection limit. The results of ESRC over time are presented in the table in FIG. 10B.

ESRC can also be used in a VC-based QoS environment. In some embodiments, a user is allowed to assign QoS levels to the flows and a percentage of bandwidth can be allocated to each QoS level, wherein a QoS level may contain one or more VCs. The bandwidth is actually the minimum bandwidth guaranteed. In practice, because not all the bandwidth is used in some VCs, the bandwidth utilization by the flows at a QoS level can be anywhere between 0% and 100% under different circumstances.

For the purpose of ESRC at the Virtual Channel Level, a VC is considered as a conduit of data and ESRC can be applied to all the flows passing through a VC. One special consideration is that the capacity of a VC may change over time. As an example, consider three VCs: VC-High, VC-Medium, and VC-Low, with relative weights of 50%, 30% and 20% in terms of bandwidth allocation. Generally, the following is true:

If all the flows through a VC could collectively push data greater than or equal to the bandwidth promised to the VC, then these flows are guaranteed a collective bandwidth through the VC.

If one of the VCs is not using its minimum guaranteed bandwidth, then the other VCs can use the surplus bandwidth. For example, if VC-High is seeing no traffic, then VC-Med and VC-Low could potentially send data at 60% and 40% of the link bandwidth.

Based on the above observation it is implied that a VC's capacity is not fixed like the case of a physical link. It is therefore desirable to compute the instantaneous capacity of a VC for ESRC. In one embodiment, the aggregate bandwidth of a VC group in the same QoS class is computed based on the following formulation.

The aggregate maximum bandwidth of a QoS class v (which is a cluster of one or more VCs) is denoted as $C_v$. The index "v" denotes the QoS class. Note that the smaller v is, the higher the QoS priority. The minimum bandwidth that should be allocated to a $QoS_i$, is denoted as $R_i$, where i is the index for QoS class. $B_i$ denotes the amount of bandwidth that is actually used in QoS class i. In one embodiment, $R_i$ is computed as:

$$R_i = \begin{cases} \min(\text{guaranteed\_capacity\_of\_QoS\_v}, B_i) & i > v \\ B_i, & i < v \end{cases} \quad (4)$$

The total upper-limit bandwidth that can be used for QoS class v is computed as:

$$C_v = \max\begin{bmatrix} \text{guaranteed\_capacity\_of\_QoS\_class\_v,} \\ \text{physical\_link\_capacity} - \sum_{i \neq v} R_i \end{bmatrix} \quad (5)$$

According to the above formulation, the surplus bandwidth in a given QoS class is allocated to the QoS classes according to their respective priority. The resulting $C_v$ for a given QoS class v (which can contain multiple VCs), can then by divided by the number of VCs in that QoS class to obtain the per-VC capacity, which is the value for C in equations (1) and (3).

Typically, a network includes many switches. Each switch many have many switch ports that are connected to live devices, and devices in the network communicate with one or more other devices. A switch generally has a built-in processor that performs protocol or non-protocol related tasks. For ESRC purposes, each switch ideally performs two operations: analyze the data points and control the ingress rate.

FIG. 11 illustrates an example of distributed congestion management using ESRC, in accordance with an embodiment of the present invention. In this example, the devices on switch SW-A are sending data to devices on switches SW-B and SW-C. Switch SW-A has four ports, and switches SW-B and SW-C have three ports each. Assume that there is no other communication between the ports.

In one embodiment, the feedback and control loop processing can be segregated into two engines, one for analysis and another for control. The responsibility of the analysis engine is to monitor each egress point on a switch and compute using ESRC the explicit rate for each source that sends data to that egress point. The sources of data through any point in the network can be determined via various means. Since each port on a switch is bidirectional (irrespective of whether it is an ISL or an F/FL_Port), the analysis engine runs on each port of a switch that is online.

In FIG. 11, the analysis engine can run on:
The SW-A side of ISL-1. The analysis engine will determine that two sources, A1 and A2, are sending data through ISL-1.
The SW-A side of ISL-2. The analysis engine will determine that two sources A1 and A2 are sending data through ISL-2.
The A1 side of SW-A and A2 side of SW-A. The analysis engine will determine there is no congestion.
The B1 side of SW-B. The analysis engine will determine there are two sources of data, A1 and A2.
The B2 side of SW-B. The analysis engine will determine there is only one source of data, A2.
The C1 side of SW-C. The analysis engine will determine there is only one source of data, A1.
The C2 side of SW-C. The analysis engine will determine there is only one source of data A2.

After computing the sources for each point of egress data, the analysis engine determines the explicit rate for each of the sources using ESRC. For example, analysis engine running at B1 calculates the explicit rates for A1 and A2. Similarly, at B2, C1, C2, and ISL-1 on SWA and ISL-2 on SWA, the system computes the explicit rates for A1 and A2.

The explicit rates of each of the sources are communicated to the control engine of the switch on which the source port resides. The purpose of the control engine is to receive explicit rate messages from various analysis engines in the network and apply appropriate rate limiting to the ingress ports. Like the analysis engine, the control engine runs on each switch too. For instance, as illustrated in FIG. 12, switch SW-A includes a control engine 1102 and an analysis engine 1104. Control engine 1102 at port A1 receives explicit rate message from analysis engines at B1 and C1.

In one embodiment, a feedback and control loop is formed between the analysis and control engines distributed across the network. To reduce the amount of communication required for congestion management each switch (or domain) runs one instance of analysis and control engine each. The following steps describe the operation of this feedback and control loop.

(i) The analysis engine performs analysis in iterations. For every iteration, it determines the explicit rate requirement for the sources associated with each of the port in the switch with which the analysis engine is associated. It is possible that more than one port in the switch requires different explicit rate from the same source in an iteration of analysis. In such a case, the analysis engine keeps the minimum rate required for each source. For example, analysis engine running on switch SW-B as illustrated in FIG. 11 performs analysis for ports B1, B2, and ISL-1 at SW-B. At the end of the iteration, the analysis engine will have the following data:
a. Explicit rate required of A1 based on B1.
b. Explicit rate required of A2 based on B1.
c. Explicit rate required of A2 based on B2.
Note that the analysis engine on SW-B encounters two rate requirement for the same source port A2, one based on B1 and the other on B2. As stated earlier, the analysis engine takes the lesser of the two. In summary, for each iteration, of all ports in a switch, the analysis engine computes the minimum rate requirement for each of the source ports.

(ii) The analysis engine groups source rate requirements based on the switch to which the source port belongs and sends the consolidated data to the control engine of the corresponding switches. For example, in FIG. 11, the analysis engines on SW-B and SW-C will send a message to the control engine on SW-A. Analysis engine on SW-A find no source rate requirements for ports on SW-B and SW-C since no flows are sending data to ports on SW-A. In this case, the analysis engine on SW-A does not send any message to SW-B or SW-C.

(iii) The control engine on each switch maintains a table of explicit rate requirement from the analysis engines of all other switches on per local port basis. For example, the control engine on SW-A maintains a table as illustrated in FIG. 13. As stated earlier, the control engine throttles its ports to the minimum of all rates required from other switches for the same source port. Based on the table in FIG. 13, the control engine in SW-A will limit A1 to 40 and A2 to 31. The control engine performs this check every time it receives a message from the analysis engines from other switches. Since different analysis and control engines are running without any time reference or synchronization, a control engine may receive messages from various analysis engines at different times. In one embodiment, the control engine performs a minimum rate check on receipt of every message from an analysis engine.

Additive Increase Multiplicative Decrease (AIMD)

In this model, the network equipment feeds information back to the sources of data and the sources react to the feedback by increasing or decreasing the data rate. The information fed back by the network equipment is based on the state of numerous variables at the resource point (e.g., amount of congestion or data rate above a threshold, etc).

Figure 14:
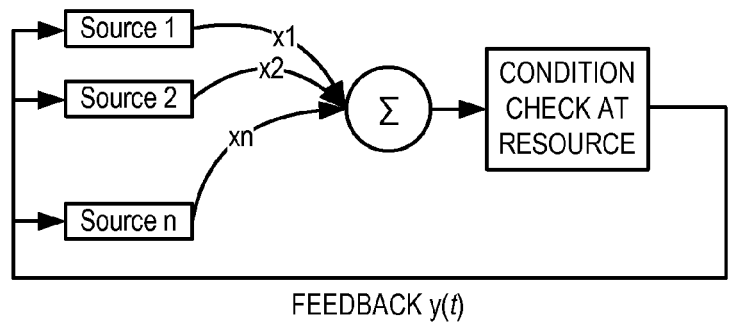
FIG. 14 illustrates the principal of operation of an additive-increase-multiplicative-decrease approach to congestion management, in accordance with an embodiment of the present invention.

The diagram illustrated in FIG. 14 shows n sources feeding data into a point in the network. The rate of data from each source is denoted by $x_i$ (e.g., $x_1$ represents data rate of source 1). The aggregate rate of data passing a specified point in network can be denoted as $\Sigma x_i(t)$, where t represents the point in time.

The specified point in network performs a test to determine whether the sources need to increase or decrease their rate. The results are communicated back to the sources as feedback y(t). The sources then adjust their rate (increase of decrease) such that:

$$x_i(t+1)=x_i(t)+d(t),$$

where, d(t) represents the increase or decrease in rate for source i:

$$d(t)=f(y(t), x_i(t)).$$

In one embodiment, the feedback y(t) can be made binary, such that a value of "1" may indicate to the sources to increase the rate and value "0" to decrease the rate. In response, a respective source increases its rate by a fixed amount irrespective of the current rate but decreases by a multiplication factor with respect to its current rate. A binary feedback is simple, but the system may take longer to converge to efficiency and fairness. In a further embodiment, the feedback contains a real number indicative of the state of the variables at the point of interest in the network. The following information at an E_Port can be used to compute y(t) as a real number: amount of congestion, total number of sources feeding into a specific point in the network, and instantaneous throughput of the network channel.

In general, the AIMD approach can be summarized as follows:

$$x_i(t+1)=a+x_i(t), \text{ where } a=d(t) \text{ (when feedback requires rates to be increased);}$$

$$x_i(t+1)=b \cdot x_i(t), \text{ where } b=d(t) \text{ (when feedback requires rates to be decreased).}$$

In one embodiment, network equipment only sends feedback when a source needs to decrease its rate. The source increase its rate automatically by automatic decay of throttle. This automatic delay mechanism automatically kicks in when the source is restricted to produce less than its possible capacity. This way, the network equipment that is detecting congestion does not need to send a second notification to the source for the source to remove its throttle when the congestion is removed.

System Operation

As state earlier, there are two possible mechanisms, namely ESRC and AIMD, that can be used to manage network congestion. In one embodiment, the network can be divided into two parts—the network core and the end devices. In terms of FC SANs, the network core comprises E_Ports and the end devices comprise F/FL_Ports as well as HBAs.

There are two approaches for running these mechanisms to achieve optimal network performance. One is to run ESRC at both the core and end devices. In this model, the explicit rate is fed back to the sources from each bottleneck in the network and a respective source is limited to run at the minimum of the explicit rates advertised by the bottlenecks.

A second approach is to run ESRC at end devices and AIMD at the network core. In this model, the ESRC is performed at the end devices (F/FL_Ports or HBAs in FC SAN) and AIMD is run at the network level (E_Ports in FC SAN). The end points (F/FL_Ports) will compute the explicit rate of their sources and send the information back to the source. The source maintains a table of all required rates from all the switches in the fabric and select the minimum of all as the effective rate.

Figure 15:
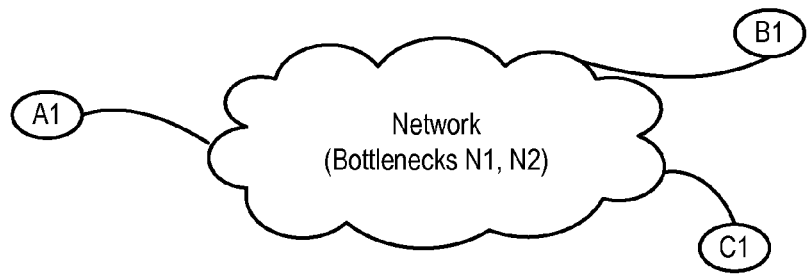
FIG. 15 illustrates an example where ESRC is run an end devices and AIMD is run in the network core, in accordance with an embodiment of the present invention.

FIG. 15 illustrates an example where ESRC is run an end devices and AIMD is run in the network core, in accordance with an embodiment of the present invention. In this example, devices A1, B1, and C1 are attached to switches A, B, and C, respectively. There are two bottlenecks in the network, called N1 and N2. A1 is sourcing data to B1 and C1. B1 and C1 are end devices, which run the ESRC. AIMD is run on bottlenecks N1 and N2. Bottlenecks N1 and N2 might only send feedback to A1 under two conditions:

(i) congestion is detected, or (ii) the throughput through the bottleneck is more than a pre-fixed threshold (e.g., 95% of the link speed of N1).

N1 or N2 only send a message to A1 if any of the above two conditions are true and the source will be throttled. Note that no indication is sent for increasing the rate at the source, since the increase automatically happens by auto decay of the throttle.

When an indication from the network core is received to reduce the rate, the source rate is reduced by multiplicative decrease and an auto decay flag is set. As long as the auto decay flag is set, the rate of the source is increased by addition (additive increase) based on the decay algorithm. The minimum rate required of the source is set by ESRC algorithm. If the source rate reaches the minimum of all the injection rate limits, $E_{min}$, the decay stops and the decay flag is cleared.

Figure 16:
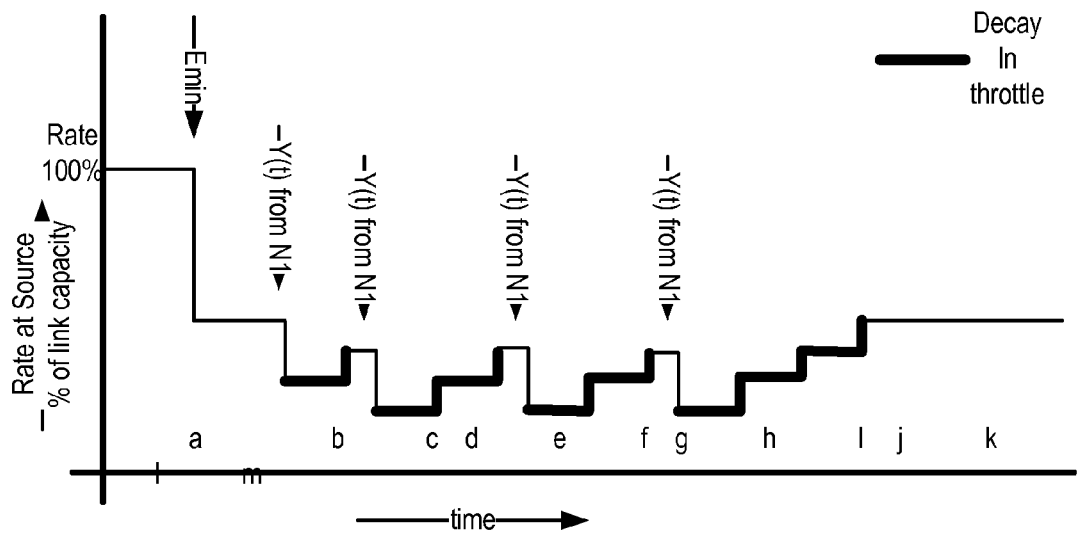
FIG. 16 illustrates the throttled data rate of source A1 in the example in FIG. 15, in accordance with an embodiment of the present invention.

FIG. 16 illustrates the throttled data rate of source A1 in the example in FIG. 15, in accordance with an embodiment of the present invention. In the beginning, source A1 is not rate limited and is capable of transmitting at 100% of its link capacity. At time 'a' B1 and C1 send explicit rate indication to A1, suggesting the rate at which A1 shall transmit data to B1 and C1. Assume that the rate required of A1 is less than A1's actual transmission rate, so at time 'a' the rate of A1 drops, since:

$$\text{rate at } A1 = E_{min} = \text{Min}(E_{B1}, E_{C1}),$$

where $E_{B1}$ and $E_{C1}$ denote the rates indicated by B1 and C1, respectively.

Now, the network bottlenecks N1 and N2 only send information back to the source A1 if A1 is required to decrease its ingress rate. Assume that at time 'b' a condition at N1 builds up such that N1 sends a feedback y(t) to A1 to reduce its rate. A1 in response applies the throttle and reduces its rate as a function of y(t) at time 'b':

$$\text{New rate at } A1 = x(t+1) = x(t) + k \cdot x(t),$$

where k is a function of y(t) and a positive number between 0 and 1.

At time 'b' the decay flag is set and the throttle decay of A1 starts, such that at time 'c' the rate of A1 increases. As a result, the condition at N1 comes back and results in sending a feedback y(t) to A1. A1 responds by reducing its rate at time 'd.' The decay again starts at time 'd.' This increase and decrease of rate continues till time 'j.' After this time the decay continues (but the condition at N1 does not come back) till the rate is equal to $E_{min}$ at time 'm.' Note that at any time, the rate at A1 is always less than or equal to $E_{min}(t)$.

Extending Congestion Management to HBA

Figure 17:
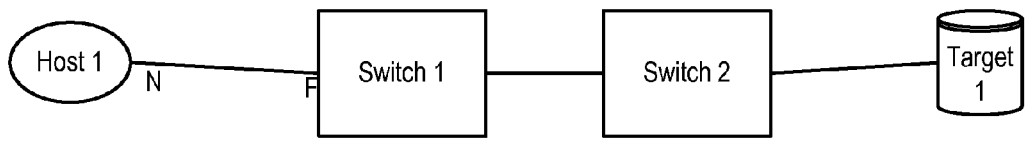
FIG. 17 illustrates an example where conventional rate limiting is used on an HBA.

Conventionally, as illustrated in FIG. 17, an HBA can request a target device about the target device's N_Port link capability. In turn, the HBA rate limits its transmission to each of the targets in such a way that it does not exceed the link capacity of the target. There are few short comings of this model.

Figure 18:
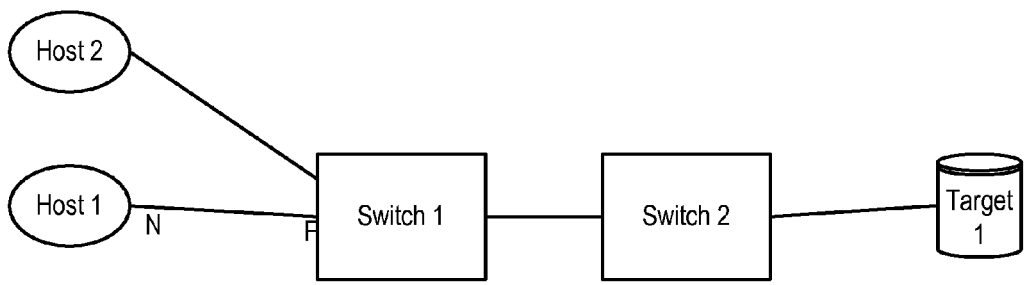
FIG. 18 illustrates an example where conventional rate limiting is used on an HBA.

First, the target's internal hardware may not be capable of consuming data at the rate of the N_Port link, resulting in back pressuring and congestion. Second, a target-based rate limiting approach algorithm does not account for the fact that there may be more than one host sending data to the same target, as illustrated in FIG. 18. For example, assume that host 1 and host 2 are both taking to the same target 1. Now, even if host 1 and host 2 individually throttle their transmission to the link capacity of target 1, the aggregate of transmissions (host 1+host 2) is more than what target 1 can consume. As a result, there will be back pressuring resulting in congestion. Embodiments of the present invention facilitate the congestion-management to HBAs. In other words, the congestion management mechanism described above can be applied to the HBA. Furthermore, the rate control information from switches can be communicated to a rate control entity in the HBA instead of the egress switch.

No VC and QoS between HBA and Switch

If there is no VC between the HBA and the switch, then rate limiting is applied at the ingress port of the switch to which the HBA is connected. The rate limiting can be applied by delaying the dispatch of buffer credits back to the HBA.

Virtual Machines on Hosts

Figure 19:
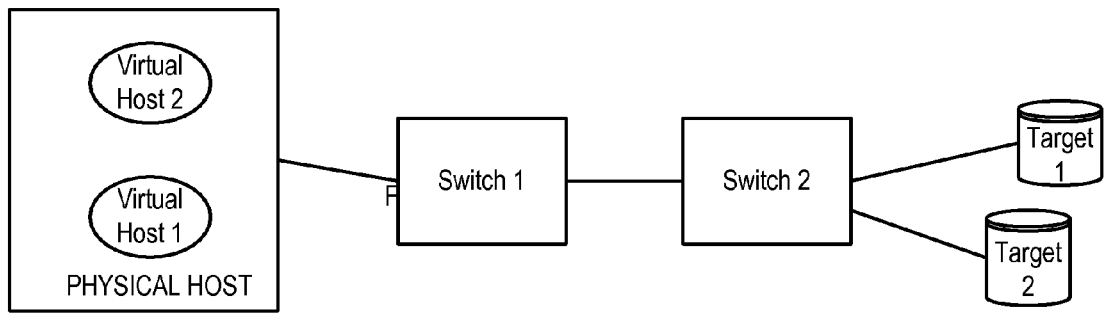
FIG. 19 illustrates an example of extending congestion management to an HBA in a virtual-machine environment, in accordance with an embodiment of the present invention.

This is a similar setup as the previous scenario (i.e., no VC or QoS between HBA and switch). As illustrated in FIG. 19, there are two virtual machines, virtual host 1 and virtual host 2, running on a physical host. Applying rate limiting on a switch port will result in rate limiting the traffic for both virtual host 1 and virtual host 2. If NPIVs are associated with each of the virtual machines, it makes more sense to rate limit the data traffic from each of the host from within the HBA by controlling the transmission of data. Correspondingly, the switch port-based rate limiting is not used.

QoS and VC-Enabled HBA

Figure 20:
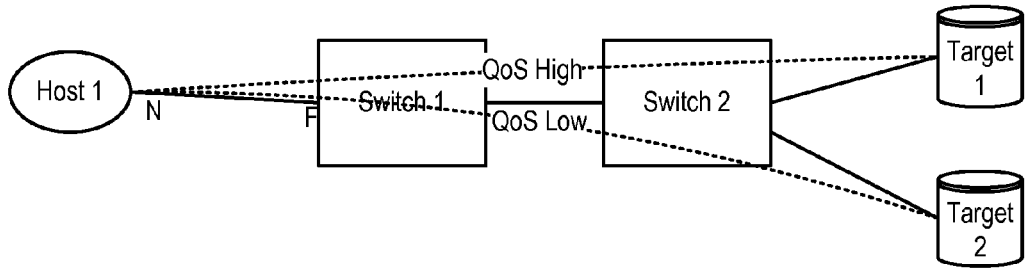
FIG. 20 illustrates an example of extending congestion management to a VC-enabled HBA, in accordance with an embodiment of the present invention.

If VC and QoS are enabled between a host's HBA and a switch, then it is desirable to apply rate limiting at the HBA rather than at the F_Port the switch. As illustrated in the example in FIG. 20, host 1 is communicating with target 1 with a high QoS priority, and the same host is communicating, via the same HBA link, with target 2 with a low QoS priority. If there is congestion detected on target 2, the congestion management mechanism would require the source to slow down. If rate limiting is applied at the switch 1's F_Port connected to host 1, it will have the side effect of limiting the high-QoS traffic going from host 1 to target 1. In this case, it is desirable to apply rate limiting at per-VC or QoS level from within the HBA by controlling the transmission of data associated with each VC or QoS class, instead of rate limiting the return of buffer credits at the F_Port of switch 1.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   determining a threshold data rate on an outgoing link coupled to a switch;
   determining a plurality of sources of data flows sent to the outgoing link;
   determining an aggregate arrival data rate from the plurality of sources for the outgoing link for a current period;
   computing a first desired injection data rate for the current period for a first source of the plurality of sources based on the threshold data rate on the outgoing link, the aggregate arrival data rate for the outgoing link, and a second desired injection data rate for the first source computed for a previous period; and
   constructing for the first source a congestion notification comprising the first desired injection data rate for the first source, thereby allowing the first source to throttle its data injection to prevent network congestion.

2. The method of claim 1, wherein a time difference between the current period and the previous period represents a regular time interval.

3. The method of claim 1, wherein determining the threshold data rate on the outgoing link comprises setting the threshold data rate to the lesser of:
   a capacity of the outgoing link; and
   a maximum data rate at which a receiving end of the outgoing link can accept data.

4. The method of claim 1, further comprising determining, for an initial period, an initial injection rate by dividing the threshold data rate on the outgoing link by a number of the plurality of sources.

5. The method of claim 1, wherein determining the first desired injection data rate comprises:
   computing an overload factor for the current period by dividing the aggregate arrival data rate for the current period by the threshold data rate on the outgoing link; and
   dividing the second desired injection data rate by the overload factor for the current period.

6. The method of claim 1, wherein determining the first desired injection data rate comprises:
  computing a tentative injection rate for the first source in conjunction with a respective outgoing link on the switch; and
  setting the injection data rate for the first source to be the lowest tentative injection rate.

7. The method of claim 1,
  wherein determining the threshold data rate on the outgoing link comprises determining a threshold data rate of a first logical channel on the outgoing link;
  wherein the bandwidth on the outgoing link is allocated into a plurality of logical channels; and
  wherein a respective logical channel is associated with a dedicated -buffer and capable of transporting a plurality of data flows with data frames of variable length.

8. The method of claim 7, wherein determining the threshold data rate of the first logical channel comprises dynamically allocating unused bandwidth from other logical channels to the first logical channel based on a Quality of Service (QoS) class of the first logical channel.

9. The method of claim 1, wherein the switch is a Fibre Channel (FC) switch.

10. A method, comprising:
  determining whether an outgoing link is congested by:
    determining a threshold data rate on an outgoing link coupled to a switch;
    determining an aggregate arrival data rate for a current period for the outgoing link from a plurality of sources of data flows sent to the outgoing link;
    determining whether the aggregate arrival data rate for the outgoing link exceeds the threshold data rate; and
  in response to determining the outgoing link to be congested, constructing a congestion notification comprising a throttle value for a switch or source, which sends data to the outgoing link, thereby allowing the switch or source to apply a throttle to its injection data rate to prevent network congestion;
  wherein the throttle value is a first desired injection data rate for the current period computed based on the threshold data rate on the outgoing link, the aggregated arrival rate for the outgoing link, and a second desired injection data rate for the first source computed for a previous period.

11. The method of claim 10, wherein determining whether the outgoing link is congested comprises monitoring the amount of time a frame spends waiting for credit in a buffer corresponding to the outgoing link.

12. The method of claim 10, further comprising:
  constructing a second congestion notification indicating that a reduction of injection date rate by a multiplicative factor is desired.

13. The method of claim 10, further comprising:
  in response to determining the outgoing link not to be congested, refraining from constructing the congestion notification, thereby allowing the switch or source to automatically increase a local injection data rate until the local injection data rate reaches a predetermined value or the outgoing link becomes congested.

14. The method of claim 10, wherein the outgoing link is coupled to a Fibre Channel (FCS) switch.

15. A switch, comprising:
  a threshold-data-rate determination mechanism configured to determine a threshold data rate on an outgoing link coupled to the switch;
  a source determination mechanism configured to determine a plurality of sources of data flows sent to the outgoing link;
  a throughput determination mechanism configured to determine an aggregate arrival data rate from the plurality of sources for the outgoing link for a current period;
  an injection-data-rate computation mechanism configured to compute a first desired injection data rate for the current period for a first source of the plurality of sources based on the threshold data rate on the outgoing link, the aggregate arrival data rate for the outgoing link, and a second desired injection data rate for the first source computed for a previous period; and
  a communication mechanism configured to construct for the first source a congestion notification comprising the first desired injection data rate for the first source, thereby allowing the first source to throttle its data injection to prevent network congestion.

16. The switch of claim 15, wherein a time difference between the current period and the previous period represents a regular time interval.

17. The switch of claim 15, wherein while determining the threshold data rate on the outgoing link, the threshold-data-rate determination mechanism is configured to set the threshold data rate to the lesser of:
  a capacity of the outgoing link; and
  a maximum data rate at which a receiving end of the outgoing link can accept data.

18. The switch of claim 15, wherein the injection-data-rate determination mechanism is further configured to determine, for an initial period, an initial injection rate by dividing the threshold data rate on the outgoing link by a number of the plurality of sources.

19. The switch of claim 15, wherein while determining the first desired injection data rate, the injection-data-rate determination mechanism is further configured to:
  compute an overload factor for the current period by dividing the aggregate arrival data rate for the current period by the threshold data rate on the outgoing link; and
  divide the second desired injection data rate by the overload factor for the current period.

20. The switch of claim 15, wherein while determining the first desired injection data rate, the injection-data-rate determination mechanism is configured to:
  compute a tentative injection rate for the first source in conjunction with a respective outgoing link on the switch; and
  set the injection data rate for the first source to be the lowest tentative injection rate.

21. The switch of claim 15,
  wherein while determining the threshold data rate on the outgoing link, the threshold-data-rate determination mechanism is configured to determine a threshold data rate of a first logical channel on the outgoing link;
  wherein the bandwidth on the outgoing link is allocated into a plurality of logical channels; and
  wherein a respective logical channel is associated with a dedicated buffer and capable of transporting a plurality of data flows with data frames of variable length.

22. The switch of claim 21, wherein while determining the threshold data rate of the first logical channel, the threshold-data-rate determination mechanism is configured to dynamically allocate unused bandwidth from other logical channels to the first logical channel based on a Quality of Service (QoS) class of the first logical channel.

23. The switch of claim 15, wherein the switch is a Fibre Channel (FCS) switch.

24. A switch, comprising:
a congestion detection mechanism configured to determine whether an outgoing link coupled to the switch is congested by:
   determining a threshold data rate on the outgoing link; and
   determining an aggregate arrival data rate for a current period for the outgoing link from a plurality of sources of data flows sent to the outgoing link;
   determining whether the aggregate arrival data rate for the outgoing link exceeds the threshold data rate; and
a communication mechanism configured to, in response to determining the outgoing link to be congested, constructing a congestion notification comprising a throttle value for a switch or source, which sends data to the outgoing link, thereby allowing the switch or source to apply a throttle to its injection data rate to prevent network congestion;
wherein the throttle value is a first desired injection data rate for the current period computed based on the threshold data rate on the outgoing link, the aggregated arrival rate for the outgoing link, and a second desired injection data rate for the first source computed for a previous period.

25. The switch of claim 24, wherein while determining whether the outgoing link is congested, the congestion detection mechanism is configured to monitor the amount of time a frame spends waiting for credit in a buffer corresponding to the outgoing link.

26. The switch of claim 24,
wherein the communication mechanism is further configured to construct a second congestion notification indicating that a reduction of injection date rate by a multiplicative factor is desired.

27. The switch of claim 24, further comprising, in response to determining the outgoing link not to be congested, the communication mechanism is further configured to preclude the switch from constructing the congestion notification, thereby allowing the switch or source to automatically increase a local injection data rate until the local injection data rate reaches a predetermined value or the outgoing link becomes congested.

28. The switch of claim 24, wherein the switch is a Fibre Channel (FCS) switch.

29. An end-host network interface, comprising:
a threshold-data-rate determination mechanism configured to determine a threshold data rate to a server or virtual server;
a source determination mechanism configured to determine a plurality of sources of data flows sent to the server or virtual server;
a throughput determination mechanism configured to determine an aggregate arrival data rate from the plurality of sources for the server or virtual server for a current period;
an injection-data-rate computation mechanism configured to compute a first desired injection data rate for a current period for a first source of the plurality of sources based on the threshold data rate on the server or virtual server, the aggregate arrival data rate for the server or virtual server, and a second desired injection data rate for the first source computed for a previous period; and
a communication mechanism configured to construct for the first source a congestion notification comprising the first desired injection data rate for the first source, thereby allowing the first source to throttle its data injection to prevent network congestion.

30. The end-host network interface of claim 29, wherein a time difference between the current period and the previous period represents a regular time interval.

31. The end-host network interface of claim 29, wherein while determining the threshold data rate to the server or virtual server, the threshold-data-rate determination mechanism is configured to set the threshold data rate to the lesser of:
a capacity of a link coupled to the server or virtual server; and
a maximum data rate at which the server or virtual server can accept data.

32. The end-host network interface of claim 29, wherein the injection-data-rate determination mechanism is further configured to determine, for an initial period, an initial injection rate by dividing the threshold data rate to the server or virtual server by a number of the plurality of sources.

33. The end-host network interface of claim 32, wherein while determining the first desired injection data rate, the injection-data-rate determination mechanism is further configured to:
compute an overload factor for the current period by dividing the aggregate arrival data rate for the current period by the threshold data rate to the server or virtual server; and
divide the second desired injection data rate by the overload factor for the current period.

34. The end-host network interface of claim 29, wherein while determining the first desired injection data rate, the injection-data-rate determination mechanism is configured to:
compute a tentative injection rate for the first source in conjunction with a respective server or virtual server coupled to the end-host network interface; and
set the injection data rate for the first source to be the lowest tentative injection rate.

35. The end-host network interface of claim 29,
wherein while determining the threshold data rate to the server or virtual server, the threshold-data-rate determination mechanism is configured to determine the threshold data rate of a first logical channel on a link coupled to the server or virtual server;
wherein the bandwidth on the link is allocated into a plurality of logical channels; and
wherein a respective logical channel is associated with a dedicated buffer and capable of transporting a plurality of data flows with data frames of variable length.

36. The end-host network interface of claim 35, wherein while determining the threshold data rate of the first logical channel, the threshold-data-rate determination mechanism is configured to dynamically allocate unused bandwidth from other logical channels to the first logical channel based on a Quality of Service (QoS) class of the first logical channel.

37. The end-host network interface of claim 29, wherein the end-host network interface is a Fibre Channel (FC) host bus adaptor (HBA).

* * * * *